United States Patent
Watanabe et al.

(10) Patent No.: US 7,982,789 B2
(45) Date of Patent: Jul. 19, 2011

(54) IMAGE SENSING APPARATUS DRIVING METHOD, IMAGE SENSING APPARATUS, AND IMAGE SENSING SYSTEM

(75) Inventors: Takanori Watanabe, Yamato (JP); Tetsuya Itano, Zama (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 12/168,506

(22) Filed: Jul. 7, 2008

(65) Prior Publication Data

US 2009/0015699 A1    Jan. 15, 2009

(30) Foreign Application Priority Data

Jul. 11, 2007    (JP) ................... 2007-182552

(51) Int. Cl.
    *H04N 5/335*    (2011.01)
(52) U.S. Cl. ......... 348/308; 348/302; 348/294; 348/272
(58) Field of Classification Search ............. 348/308, 348/302
    See application file for complete search history.

(56) References Cited

U.S. PATENT DOCUMENTS

| | | | | |
|---|---|---|---|---|
| 5,955,753 | A | 9/1999 | Takahashi | 257/292 |
| 6,731,337 | B2 | 5/2004 | Watanabe | 348/308 |
| 6,973,265 | B2 | 12/2005 | Takahashi | 396/121 |
| 6,992,714 | B1* | 1/2006 | Hashimoto et al. | 348/273 |
| 7,126,102 | B2 | 10/2006 | Inoue et al. | 250/214 R |
| 7,265,783 | B2* | 9/2007 | Fukuda | 348/240.2 |
| 7,321,110 | B2 | 1/2008 | Okita et al. | 250/208.1 |
| 7,408,210 | B2 | 8/2008 | Ogura et al. | 257/233 |
| 7,479,994 | B2* | 1/2009 | Yang et al. | 348/241 |
| 7,623,172 | B2* | 11/2009 | Wada et al. | 348/302 |
| 7,688,368 | B2* | 3/2010 | Kijima et al. | 348/272 |
| 2002/0154347 | A1* | 10/2002 | Funakoshi et al. | 358/513 |
| 2003/0133028 | A1* | 7/2003 | Morinaka et al. | 348/273 |
| 2004/0183929 | A1* | 9/2004 | Murata et al. | 348/272 |
| 2004/0196396 | A1* | 10/2004 | Fujii et al. | 348/272 |
| 2006/0043393 | A1 | 3/2006 | Okita et al. | 257/93 |
| 2006/0044434 | A1 | 3/2006 | Okita et al. | 348/294 |
| 2006/0061674 | A1 | 3/2006 | Iida et al. | 348/308 |
| 2006/0208291 | A1 | 9/2006 | Koizumi et al. | 257/292 |
| 2006/0208292 | A1 | 9/2006 | Itano et al. | 257/292 |
| 2006/0238633 | A1 | 10/2006 | Kinugasa et al. | 348/300 |
| 2007/0115377 | A1 | 5/2007 | Noda et al. | 348/294 |
| 2008/0029689 | A1 | 2/2008 | Kobayashi et al. | 250/208.1 |
| 2008/0029787 | A1 | 2/2008 | Watanabe et al. | 257/233 |
| 2008/0029793 | A1 | 2/2008 | Watanabe et al. | 257/291 |
| 2008/0030612 | A1 | 2/2008 | Itano et al. | 348/340 |
| 2008/0036890 | A1 | 2/2008 | Yamashita et al. | 348/308 |
| 2008/0036891 | A1 | 2/2008 | Ono et al. | 348/308 |
| 2008/0158403 | A1 | 7/2008 | Itano et al. | 348/308 |
| 2008/0205792 | A1* | 8/2008 | Andersen | 382/299 |
| 2008/0211950 | A1 | 9/2008 | Ono et al. | 348/308 |
| 2009/0073281 | A1* | 3/2009 | Ohno | 348/223.1 |

FOREIGN PATENT DOCUMENTS

EP    0 880 276 A2    11/1998

(Continued)

*Primary Examiner* — Jason Chan
*Assistant Examiner* — Cynthia Calderon
(74) *Attorney, Agent, or Firm* — Fitzpatrick, Cella, Harper & Scinto

(57) ABSTRACT

Since pixel signals are not only added in the row direction but also averaged in the column direction, it is possible to sufficiently increase the frame rate even when the number of pixels increases. Additionally, since the spatial centers of gravity of the added or averaged signals are arranged at equal intervals in a Bayer array, it is possible to reduce false color (moiré) generation and suppress the decrease in the spatial resolution.

14 Claims, 15 Drawing Sheets

FOREIGN PATENT DOCUMENTS

| | | |
|---|---|---|
| JP | 8-182005 A | 7/1996 |
| JP | 9-046596 A | 2/1997 |
| JP | 10-332601 A | 12/1998 |
| JP | 2000-050170 A | 2/2000 |
| JP | 2001-036920 A | 2/2001 |
| JP | 2005-198001 A | 7/2005 |

* cited by examiner

IMAGE SENSING APPARATUS DRIVING METHOD, IMAGE SENSING APPARATUS, AND IMAGE SENSING SYSTEM

BACKGROUND OF THE INVENTION

1. Field of the Invention

The present invention relates to an image sensing apparatus driving method, image sensing apparatus, and image capturing system.

2. Description of the Related Art

Digital cameras, video cameras, portable phones equipped with cameras are recently starting to use a CMOS image sensing apparatus. The indices of performance of an image sensing apparatus are the number of pixels and the image signal readout rate.

To increase the number of pixels, a method of making a plurality of pixels share an active element in a MOS image sensing apparatus has been proposed. In Japanese Patent Laid-Open No. 2005-198001, four pixels share one floating diffusion and one active element. This reduces the pixel pitch and increases the number of pixels per predetermined area.

On the other hand, to speed up pixel signal readout, the number of output channels is increased in a MOS image sensing apparatus. Alternatively, to speed up pixel signal readout, the number of pixels is compressed by thinning pixel signals in accordance with the application purpose, thereby increasing the frame rate.

To speed up pixel signal readout, the number of pixels may be reduced by adding the signals of a plurality of pixels and then outputting the pixel signals so that the frame rate increases. In Japanese Patent Laid-Open No. 9-46596, a plurality of pixels share one floating diffusion and one active element. The floating diffusion adds electric carriers acquired by a plurality of pixels so that the pixel signals in the column direction can be added without an increase in the readout time.

The readout method described in Japanese Patent Laid-Open No. 9-46596 cannot add pixel signals in the row direction. This may make it impossible to sufficiently compress an image. It may therefore be impossible to sufficiently improve the frame rate when the number of pixels increases.

SUMMARY OF THE INVENTION

The present invention provides an image sensing apparatus driving method, image sensing apparatus, and image capturing system capable of reducing false color generation and obtaining a sufficient frame rate even when the number of pixels increases.

According to the first aspect of the present invention, there is provided a method of driving an image sensing apparatus including an image sensing region which includes a plurality of photoelectric conversion units arranged in a column direction and in a row direction, a plurality of column signal lines each of which transfers, for each column, a signal corresponding to electric carriers of each of the plurality of photoelectric conversion units, and a plurality of color filters each of which selectively transmits one of light components of a first color, a second color, a third color, and a fourth color, the method comprising: a first step of adding signals of at least two photoelectric conversion units arranged in the column direction in the image sensing region; and a second step of adding or averaging, for at least two columns, the signals output via the plurality of column signal lines after the first step, wherein in the image sensing region, a plurality of unit arrays are arranged in the column direction and in the row direction, each of the plurality of unit arrays includes four first photoelectric conversion units, on which the light component of the first color is incident, to be added in the first step and to be added or averaged in the second step, two second photoelectric conversion units, on which the light component of the second color is incident, not to be added in the first step but to be added or averaged in the second step, two third photoelectric conversion units, on which the light component of the third color is incident, to be added in the first step but not to be added or averaged in the second step, and a fourth photoelectric conversion unit, on which the light component of the fourth color is incident, neither to be added in the first step nor to be added or averaged in the second step, wherein one of the four first photoelectric conversion units and the fourth photoelectric conversion unit are arranged on a first diagonal line in the unit array, and one of the two second photoelectric conversion units and one of the two third photoelectric conversion units are arranged on a second diagonal line in the unit array, and an array formed by a center of gravity of the four first photoelectric conversion units, a center of gravity of the two second photoelectric conversion units, a center of gravity of the two third photoelectric conversion units, and a center of gravity of the fourth photoelectric conversion unit is a Bayer array.

According to the second aspect of the present invention, there is provided a method of driving an image sensing apparatus including an image sensing region which includes a plurality of photoelectric conversion units arranged in a column direction and in a row direction, a plurality of column signal lines each of which transfers, for each column, a signal corresponding to electric carriers of each of the plurality of photoelectric conversion units, and a plurality of color filters each of which selectively transmits one of light components of a fifth color, a sixth color, a seventh color, and an eighth color, the method comprising: a first step of adding signals of at least two photoelectric conversion units arranged in the column direction in the image sensing region; and a second step of adding or averaging, for at least two columns, the signals output via the plurality of column signal lines after the first step, wherein, in the image sensing region, a plurality of unit arrays are arranged in the column direction and in the row direction, each of the plurality of unit arrays includes two fifth photoelectric conversion units, on which the light component of the fifth color is incident, not to be added in the first step but to be added or averaged in the second step, two sixth photoelectric conversion units, on which the light component of the sixth color is incident, to be added in the first step but not to be added or averaged in the second step, a seventh photoelectric conversion unit, on which the light component of the seventh color is incident, neither to be added in the first step nor to be added or averaged in the second step, and an eighth photoelectric conversion unit, on which the light component of the eighth color is incident, neither to be added in the first step nor to be added or averaged in the second step, wherein one of the two fifth photoelectric conversion units and one of the two sixth photoelectric conversion units are arranged on a first diagonal line in the unit array, and the seventh photoelectric conversion unit and the eighth photoelectric conversion unit are arranged on a second diagonal line in the unit array an array formed by a center of gravity of the two fifth photoelectric conversion units, a center of gravity of the two sixth photoelectric conversion units, a center of gravity of the seventh photoelectric conversion unit, and a center of gravity of the eighth photoelectric conversion unit is a Bayer array.

According to the third aspect of the present invention, there is provided an image sensing apparatus comprising: a plurality of color filters each of which selectively transmits one of light components of a first color, a second color, a third color, and a fourth color; an image sensing region which includes a plurality of photoelectric conversion units arranged in a column direction and in a row direction, and a plurality of adding units each of which adds, for each column, signals of at least four of the plurality of photoelectric conversion units arranged in the column direction; a plurality of column signal lines each of which transfers a signal corresponding to electric carriers of each of the plurality of photoelectric conversion units; and an adding/averaging unit which adds or averages, for at least two columns, the signals transferred via the plurality of column signal lines, wherein in the image sensing region, a plurality of unit arrays are arranged in the column direction and in the row direction, each of the plurality of unit arrays includes four first photoelectric conversion units on which the light component of the first color is incident, to be added by the adding unit and to be added or averaged by the adding/averaging unit, two second photoelectric conversion units on which the light component of the second color is incident, not to be added by the adding unit but to be added or averaged by the adding/averaging unit, two third photoelectric conversion units on which the light component of the third color is incident, to be added by the adding unit but not to be added or averaged by the adding/averaging unit, and a fourth photoelectric conversion unit on which the light component of the fourth color is incident, neither to be added by the adding unit nor to be added or averaged by the adding/averaging unit, wherein one of the four first photoelectric conversion units and the fourth photoelectric conversion unit are arranged on a first diagonal line in the unit array, one of the two second photoelectric conversion units and one of the two third photoelectric conversion units are arranged on a second diagonal line in the unit array, and an array formed by a center of gravity of the four first photoelectric conversion units, a center of gravity of the two second photoelectric conversion units, a center of gravity of the two third photoelectric conversion units, and a center of gravity of the fourth photoelectric conversion unit is a Bayer array.

According to the fourth aspect of the present invention, there is provided an image sensing apparatus comprising: a plurality of color filters each of which selectively transmits one of light components of a fifth color, a sixth color, a seventh color, and an eighth color; an image sensing region which includes a plurality of photoelectric conversion units arranged in a column direction and in a row direction, and a plurality of adding units each of which adds, for each column, signals of at least four of the plurality of photoelectric conversion units arranged in the column direction; a plurality of column signal lines each of which transfers a signal corresponding to electric carriers of each of the plurality of photoelectric conversion units; and an adding/averaging unit which adds or averages, for at least two columns, the signals transferred via the plurality of column signal lines, wherein in the image sensing region, a plurality of unit arrays are arranged in the column direction and in the row direction, each of the plurality of unit arrays includes two fifth photoelectric conversion units on which the light component of the fifth color is incident, not to be added by the adding unit but to be added or averaged by the adding/averaging unit, two sixth photoelectric conversion units on which the light component of the sixth color is incident, to be added by the adding unit but not to be added or averaged by the adding/averaging unit, a seventh photoelectric conversion unit on which the light component of the seventh color is incident, neither to be added by the adding unit nor to be added or averaged by the adding/averaging unit, and an eighth photoelectric conversion unit on which the light component of the eighth color is incident, neither to be added by the adding unit nor to be added or averaged by the adding/averaging unit, wherein one of the two fifth photoelectric conversion units and one of the two sixth photoelectric conversion units are arranged on a first diagonal line in the unit array, the seventh photoelectric conversion unit and the eighth photoelectric conversion unit are arranged on a second diagonal line in the unit array.

According to the fifth aspect of the present invention, there is provided an image capturing system comprising: an image sensing apparatus according to the third or fourth aspect of the present invention; an optical system which forms an image of light on the image sensing region of the image sensing apparatus; and a signal processing unit which processes a signal output from the image sensing apparatus to generate image data.

According to the present invention, it is possible to reduce false color generation and obtain a sufficient frame rate even when the number of pixels increases.

Further features of the present invention will become apparent from the following description of exemplary embodiments with reference to the attached drawings.

DESCRIPTION OF THE EMBODIMENTS

Figure 13:
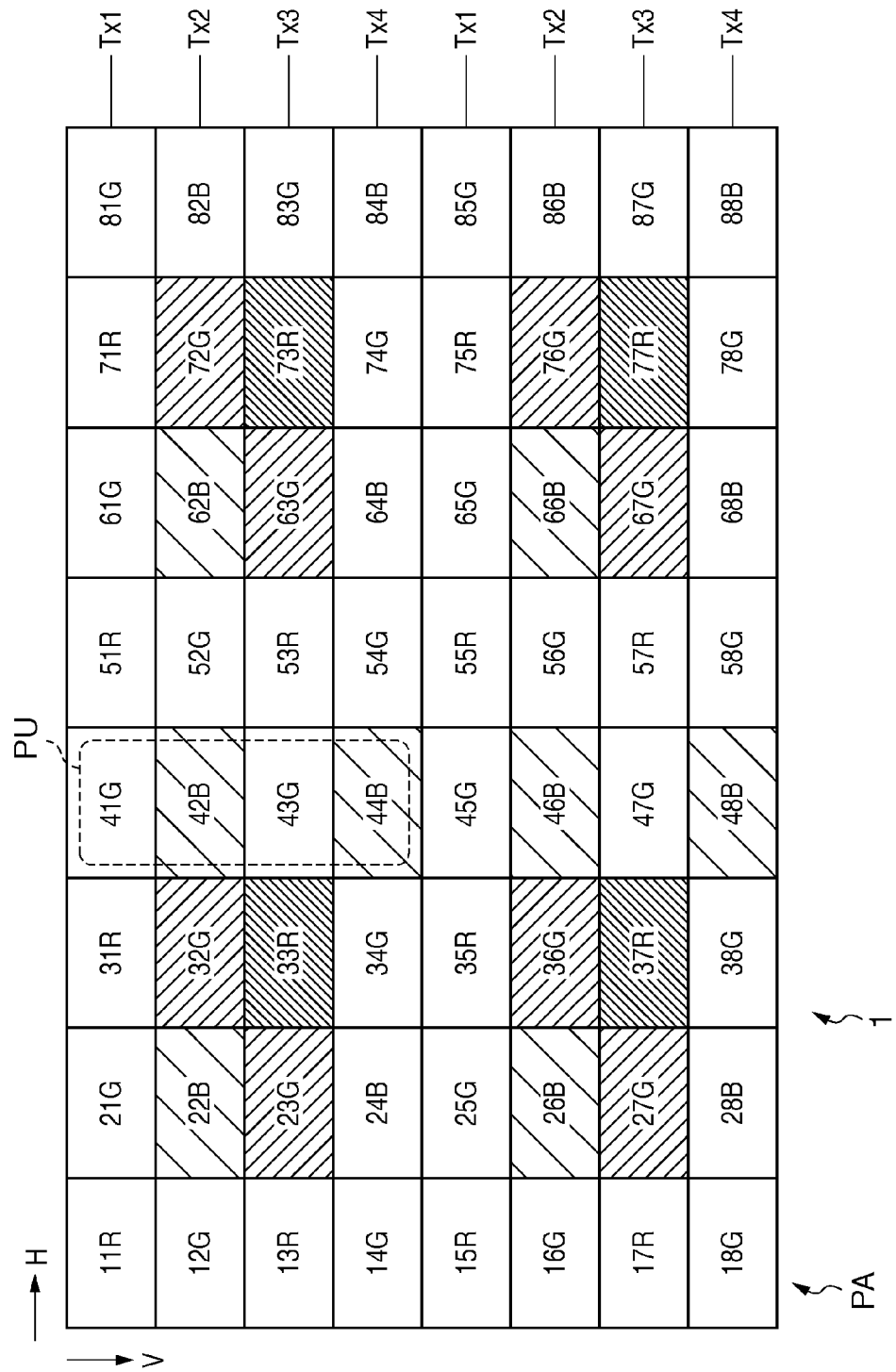
FIG. 13 is a view for explaining the problem of the present invention.
Figure 14:
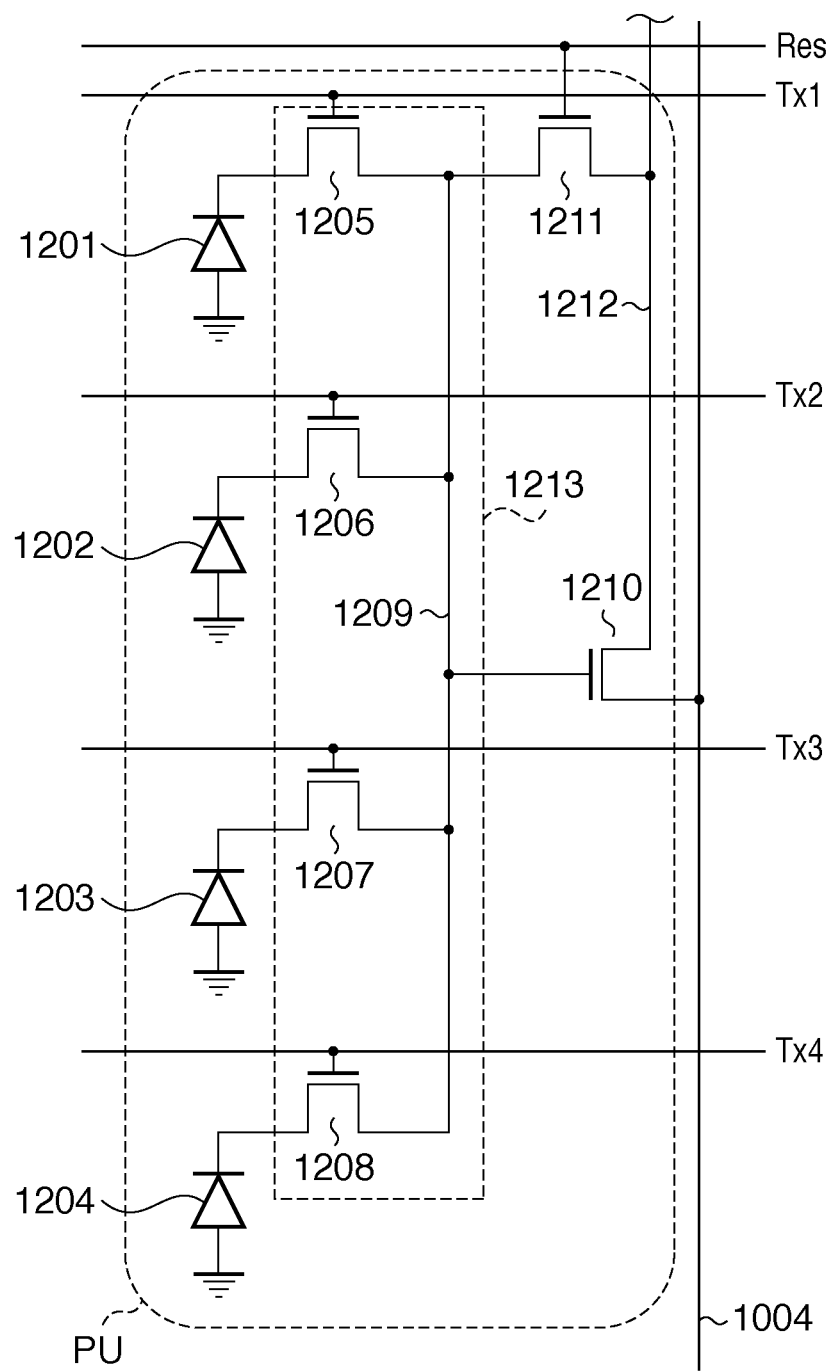
FIG. 14 is a view for explaining the problem of the present invention.
Figure 15:
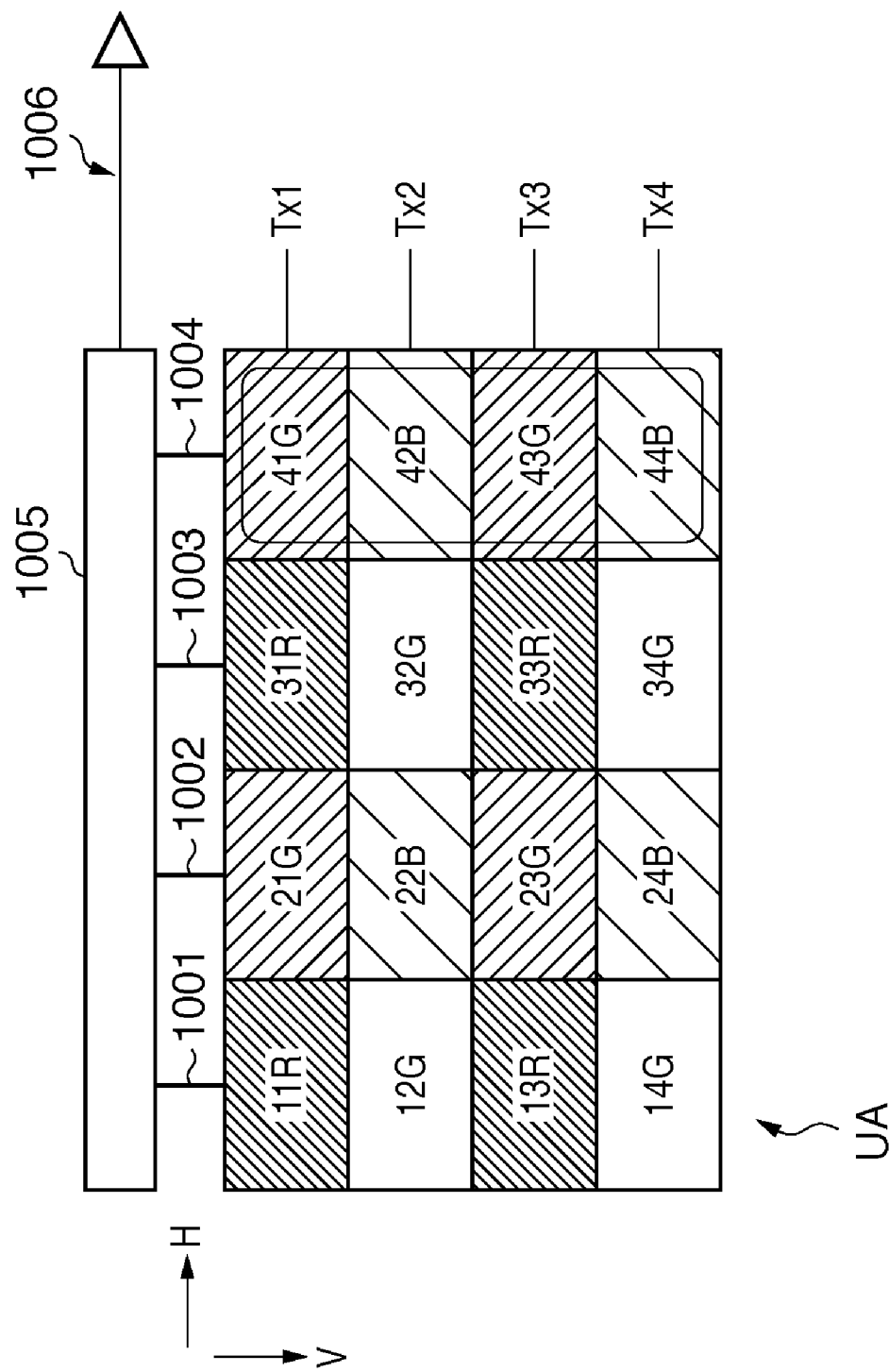
FIG. 15 is a view for explaining the problem of the present invention.

The problem of the present invention will be described with reference to FIGS. 13 to 15. FIG. 13 is a view showing an image sensing region PA in an image sensing apparatus 1. FIG. 14 is a view showing a pixel unit PU in the image sensing region PA. FIG. 15 is a view for explaining a unit array UA obtained by cutting out part of the image sensing region PA.

The image sensing apparatus 1 includes the image sensing region PA, a plurality of column signal lines 1001 to 1004, a readout unit 1005, and a selection unit (not shown).

In the image sensing region PA, a plurality of pixels 11R to 88B each including a photoelectric conversion unit are arranged in the column and row directions. In the image sensing region PA, a plurality of pixel units PU are arranged in the column and row directions, as shown in FIG. 13. As shown in FIG. 14, the pixel unit PU includes a plurality of photoelectric conversion units (pixels) adjacently arranged in the column direction. The pixels share some of their functions (e.g., amplification unit). In the image sensing region PA, a plurality of unit arrays UA are arranged in the column and row directions. That is, the unit array UA includes the plurality of photoelectric conversion units (pixels) adjacently arranged in the column and row directions, as shown in FIG. 15.

In FIG. 13, the image sensing region PA includes pixels of 8 rows×8 columns, for the descriptive convenience. Actually, the image sensing region PA includes more pixels.

A description will further be made with reference to FIG. 15. The plurality of column signal lines 1001 to 1004 transfer, for the respective columns, signals corresponding to electric carriers of the plurality of photoelectric conversion units.

The readout unit 1005 reads out signals from the plurality of photoelectric conversion units (pixels) via the plurality of column signal lines 1001 to 1004. The readout unit 1005 includes a readout circuit. The column signal lines are not illustrated in FIG. 13. That is, the image sensing apparatus 1 includes the image sensing region PA, the plurality of column signal lines 1001 to 1004, the readout unit 1005, and the selection unit (not shown).

The selection unit selectively transmits one of light components of first, second, third, and fourth colors so that the selected one of the light components of first, second, third, and fourth colors becomes incident on each of the plurality of photoelectric conversion units (pixels). The first to fourth colors are, for example, R, G (Gr), G (Gb), and B. More specifically, the selection unit includes a plurality of color filters which selectively transmit the light components of first, second, third, and fourth colors contained in incident light. The plurality of color filters form a Bayer array. The selection unit also selectively transmits one of light components of fifth, sixth, seventh, and eighth colors so that the selected one of the light components of fifth, sixth, seventh, and eighth colors becomes incident on each of the plurality of photoelectric conversion units (pixels). The fifth to eighth colors are, for example, R, G (Gr), G (Gb), and B.

The Bayer array is formed by repeating four pixels R, G, G, and B. In the repetitive unit of the matrix, the R and B pixels are arranged in the first diagonal direction, and two G pixels are arranged in the second diagonal direction. The R pixel (11R) and one (22B or 44B) of B pixels (22B, 42B, 24B, 44B) are arranged on the first diagonal line of the unit array, and one (41G) of two G pixels (21G, 41G) and one (14G) of two G pixels (12G, 14G) are arranged on the second diagonal line of the unit array. In the unit, the two G pixels are handled as different color planes for descriptive convenience. That is, the Bayer array has four color images as color planes. In this specification, R corresponds to red, G corresponds to green, and B corresponds to blue. Pixels such as 21G and 23G which are adjacent to R pixels in the row direction will be referred to as Gr. Pixels such as 12G and 14G which are adjacent to B pixels in the row direction will be referred to as Gb.

The selection unit includes, for example, the color filters forming the Bayer array, complementary color filters, a diffraction grating, and a dichroic film.

Referring to FIG. 13, 11R is short for an R pixel having an address (H=1, V=1). Similarly, 21G is short for a G pixel having an address (H=2, V=1), and 22B is short for a B pixel having an address (H=2, V=2). That is, FIG. 13 shows the positions of the photoelectric conversion units and the positions of the color filters in correspondence with each other.

The pixel unit PU will be described. As shown in FIG. 14, each pixel unit PU includes two or more photoelectric conversion units 1201, 1202, 1203, and 1204, an adding unit 1213, an amplification unit 1210, and a reset unit 1211. The adding unit 1213 includes two or more carrier transfer units 1205, 1206, 1207, and 1208 and a carrier holding unit 1209.

The two or more photoelectric conversion units 1201 to 1204 are adjacently arranged in the row direction. The photoelectric conversion units 1201 to 1204 are, for example, photodiodes. Photo-electric carriers accumulated in the photoelectric conversion units 1201 to 1204 are transferred to the carrier holding unit 1209 via the two or more carrier transfer units 1205 to 1208, respectively.

The two or more carrier transfer units 1205 to 1208 are connected to the two or more photoelectric conversion units 1201 to 1204, respectively. The carrier transfer units 1205 to 1208 are, for example, transfer transistors. The carrier transfer units 1205 to 1208 are controlled by row selection pulses Tx1, Tx2, Tx3, and Tx4. The two or more carrier transfer units 1205 to 1208 transfer the signals of the two or more photoelectric conversion units 1201 to 1204 to the carrier holding unit 1209 so that it adds at least two of the signals from the two or more photoelectric conversion units 1201 to 1204.

The carrier holding unit 1209 holds electric carriers accumulated in at least one of the two or more photoelectric conversion units 1201 to 1204. The carrier holding unit 1209 is, for example, a floating diffusion. The two or more carrier transfer units 1205 to 1208 transfer the signals (electric carriers) accumulated in the two or more photoelectric conversion units 1201 to 1204 to the carrier holding unit 1209. The carrier holding unit 1209 adds the signals (electric carriers) transferred from the two or more photoelectric conversion units 1201 to 1204. At this time, the carrier holding unit 1209 holds the added signal (electric carriers).

The amplification unit 1210 amplifies a signal corresponding to the potential of the carrier holding unit 1209 and outputs it to the column signal line 1004. The amplification unit 1210 is, for example, a source follower amplifier.

The reset unit 1211 is controlled by a reset signal Res to reset the potential of the carrier holding unit 1209 to a desired potential by a voltage supplied from a power supply 1212. The reset unit 1211 is, for example, a reset transistor. The potential of the carrier holding unit 1209 can be set to an arbitrary binary or ternary potential by switching the voltage of the power supply 1212.

The power supply 1212 can have a function of supplying a voltage to the drain of the amplification unit 1210, a function of resetting the carrier holding unit 1209 to an deselected state, and a function of resetting the carrier holding unit 1209 to a selected state.

An example will be examined in which the image compression method disclosed in Japanese Patent Laid-Open No. 9-46596 is applied to the pixel unit PU. FIG. 15 is a view showing the unit array UA in the image sensing region PA. Each unit array UA includes 4×4 pixels. The unit arrays UA are arranged in the column and row directions in the image sensing region PA. Photo-electric carriers are accumulated in the photoelectric conversion units 1201 and 1203. After that, Tx1 and Tx3 are selected (activated) simultaneously, thereby transferring the photoelectric carriers in the photoelectric conversion units 1201 and 1203 to the carrier holding unit 1209. The optical signals (photo-electric carriers) from the two photoelectric conversion units 1201 and 1203 are added on the carrier holding unit 1209. The pixels of the signals added at this time are, for example, the pixels 11R and 13R or the pixels 21G and 23G shown in FIG. 15. That is, homochromatic signals are added. The signals (voltages) are output from the carrier holding unit 1209 via the column signal lines 1001 to 1004 to the readout unit 1005 and then supplied from it to an output line 1006. For the photoelectric conversion units 1202 and 1204 as well, when Tx2 and Tx4 are selected (activated) simultaneously, the optical signals (photo-electric carriers) are added on the carrier holding unit 1209. The sum signal is output from the carrier holding unit 1209 via the column signal lines 1001 to 1004 to the readout unit 1005 and then supplied from it to the output line 1006. The signals of all pixels (4×4 pixels) 11R to 44B can be compressed to only the image signals of 2×4 pixels (at a compression ratio of only 50%) by repeating the above operation.

To raise the compression ratio, an adding/averaging unit (to be described later) is provided in the readout unit 1005 of the image sensing apparatus 1 so that signals corresponding to the first color supplied via the plurality of column signal lines 1001 to 1004 are added for two or more columns. The sum signal is output from the output line 1006. The adding/averaging unit adds or averages homochromatic pixel signals for, for example, the combination of the column signal lines 1001 and 1003 and the combination of the column signal lines 1002 and 1004.

More specifically, for example, the adding unit 1213 adds the optical signals (photo-electric carriers) of the photoelectric conversion units 1201 and 1203 on the carrier holding unit 1209 by activating Tx1 and Tx3 simultaneously. Alternatively, for example, the adding unit 1213 adds the optical signals (photo-electric carriers) of the photoelectric conversion units 1202 and 1204 on the carrier holding unit 1209 by activating Tx2 and Tx4 simultaneously. The adding/averaging unit adds or averages the signals for each of the combination of the column signal lines 1001 and 1003 and the combination of the column signal lines 1002 and 1004. This allows adding or averaging homochromatic pixel signals.

Repeating the above operation makes it possible to compress the signals of the pixels (4×4 pixels) 11R to 44B to the image signals of 2×2 pixels. Since the signals are compressed in the column and row directions, it is possible to speed up readout to the output line 1006 and improve the frame rate.

In compressing the number of pixels of an image, if the pixel signals are not only added in the column direction but also added or averaged in the row direction, the added or averaged signals may have spatial centers of gravity at uneven intervals. Since this may degrade the symmetry of the sum signals, false colors may be generated, or the spatial resolution may lower.

The sum signal of the pixels 11R, 13R, 31R, and 33R has its center of gravity at the center of the four pixels, that is, at the position of the pixel 22B spatially. Similarly, the sum signal of the pixels 21G, 41G, 23G, and 43G has its center of gravity at the position of the pixel 32G. The sum signal of the pixels 12G, 14G, 32G, and 34G has its center of gravity at the position of the pixel 23G. The sum signal of the pixels 22B, 24B, 42B, and 44B has its center of gravity at the position of the pixel 33R. When this result is illustrated for a larger number of pixels, the centers of gravity are represented by hatched portions in FIG. 13. As is apparent from FIG. 13, the array of the centers of gravity of the sum signals is not similar to the Bayer array before addition and has poor symmetry. More specifically, the G signals are not arranged at equal intervals. Additionally, the R, B, and G signals have no positional relationship with equal intervals. This phenomenon may reduce the spatial resolution of the image or generate false colors (moiré).

Figure 1:
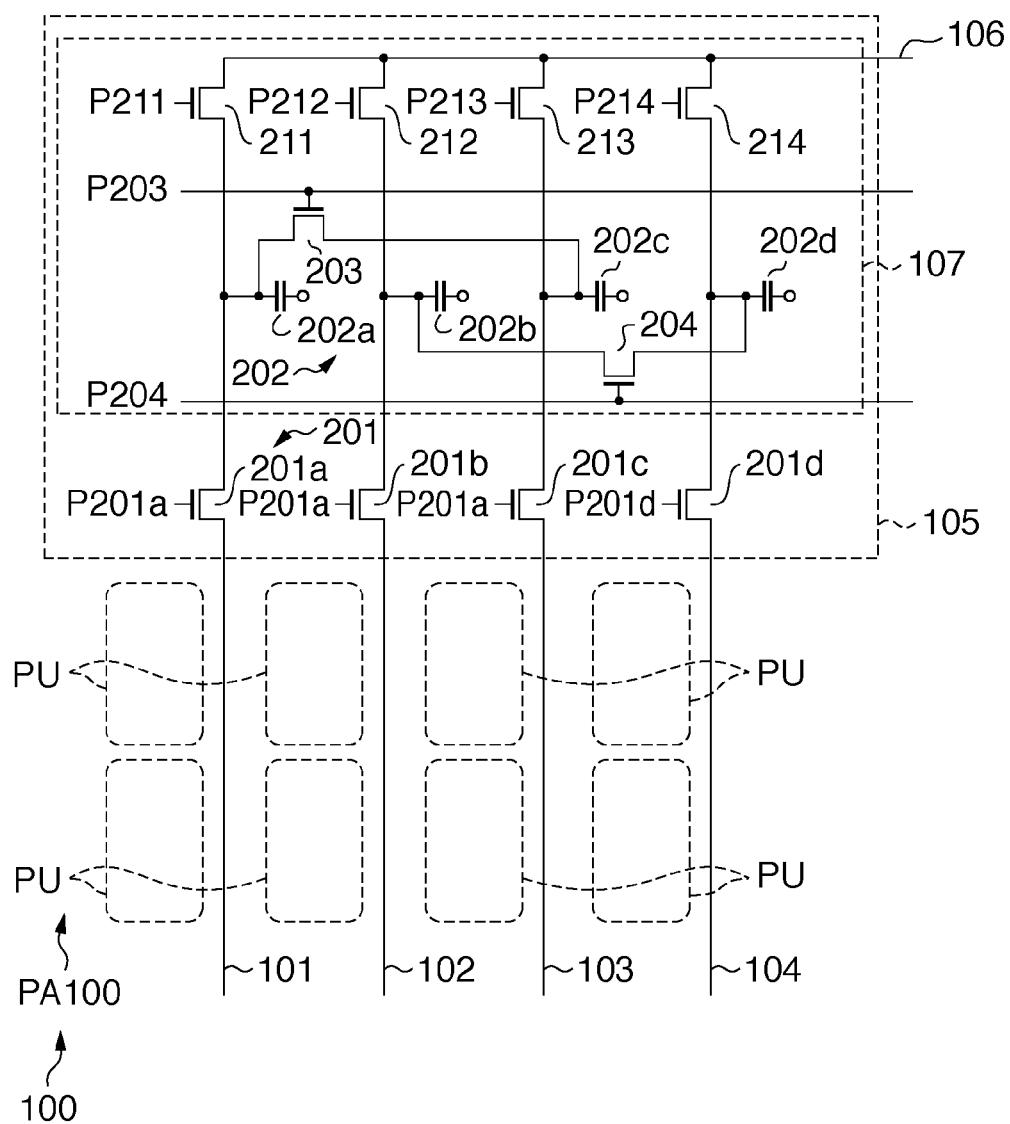
FIG. 1 is a circuit diagram showing the arrangement of an image sensing apparatus according to the first embodiment of the present invention.

An image sensing apparatus 100 according to the first embodiment of the present invention will be described next with reference to FIG. 1. FIG. 1 is a circuit diagram showing the arrangement of the image sensing apparatus 100 according to the first embodiment of the present invention. In this embodiment, the pixel unit PU including four pixels adjacently arranged in the column direction shown in FIG. 14 can be used.

Figure 2:
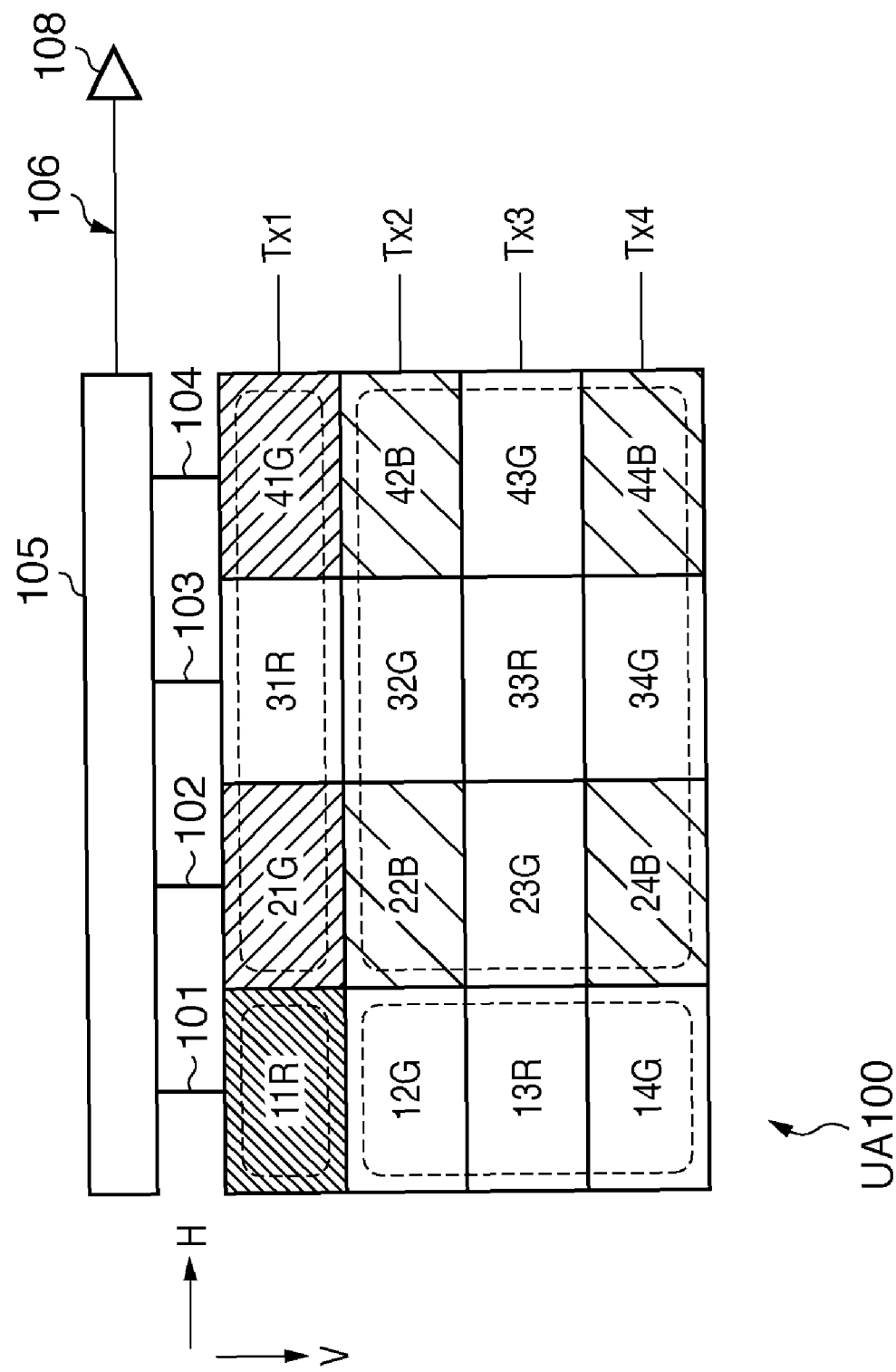
FIG. 2 is a view showing a unit array in an image sensing region according to the first embodiment of the present invention.

The image sensing apparatus 100 includes an image sensing region PA100, column signal lines 101 to 104, a readout unit 105, a selection unit (not shown), and output amplifier 108 (see FIG. 2). The selection unit has the same arrangement as described above.

In the image sensing region PA100, a plurality of pixel units PU are arranged. Each pixel unit PU includes a plurality of photoelectric conversion units 1201 to 1204 arranged in the column and row directions. The photoelectric conversion units 1201 to 1204 are, for example, photodiodes (FIG. 14).

An adding unit 1213 adds, on a carrier holding unit 1209, signals (electric carriers) from the two or more photoelectric conversion units 1201 to 1204 arranged in the column direction (first step). More specifically, the adding unit 1213 causes two or more carrier transfer units 1205 to 1208 to transfer the signals (electric carriers) of the two or more photoelectric conversion units 1201 to 1204 to the carrier holding unit 1209 and adds the signals on the carrier holding unit 1209. Here, the carrier holding unit 1209 is referred to as a node which can be a combination of multiple diffusion region connected each other via conduction material.

The column signal lines 101 to 104 extend between the pixels in the column direction. An amplification unit 1210 of each pixel unit PU output a voltage (signal) according to a voltage of the carrier holding unit 1209. Each of the column signal lines 101 to 104 transfers the voltage output from the amplification unit 1210 of each pixel unit PU to the readout unit 105.

The readout unit 105 is connected to the column signal lines 101 to 104 and a horizontal signal line 106. The readout unit 105 is, for example, a readout circuit. The readout unit 105 reads out the signals of the two or more photoelectric conversion units 1201 to 1204 via the column signal lines 101 to 104, holds the signals during a predetermined time, and then supplies the signals to the horizontal signal line 106.

The readout unit 105 includes a switch group 201 (201a, 201b, . . . ) and an adding/averaging unit 107.

The switches 201a to 201d are provided on the column signal lines 101 to 104 between the image sensing region PA100 and the adding/averaging unit 107. When the switches 201a to 201d are turned on, signals transferred via the column signal lines 101 to 104 are supplied to the adding/averaging unit 107.

The adding/averaging unit 107 includes a storage capacitor group 202 (202a to 202d), switches 203 and 204, signal transfer switches 211 to 214, and the horizontal signal line 106.

The adding/averaging unit 107 causes the storage capacitors 202a to 202d to accumulate and hold the signals transferred via the plurality of column signal lines 101 to 104. The adding/averaging unit 107 adds or averages, for two or more columns, the signals held by the storage capacitors 202a to 202d.

For example, addition by the adding/averaging unit 107 will be described. The adding/averaging unit 107 causes the storage capacitor 202a to accumulate and hold the signal transferred via the column signal line 101 and causes the storage capacitor 202c to accumulate and hold the signal transferred via the column signal line 103. When the signal transfer switch 211 is turned on, the signal accumulated and held by the storage capacitor 202a is supplied to the horizontal signal line 106. Simultaneously, when the signal transfer switch 213 is turned on, the signal accumulated and held by the storage capacitor 202c is supplied to the horizontal signal line 106. The adding/averaging unit 107 adds, on the horizontal signal line 106, the signals transferred via the plurality of column signal lines 101 and 103 for two columns (second step). The adding/averaging unit 107 outputs the sum signal to the output amplifier 108 via the horizontal signal line 106.

Averaging by the adding/averaging unit 107 will be described. For example, the adding/averaging unit 107 causes the storage capacitor 202a to accumulate and hold the signal transferred via the column signal line 101 and causes the storage capacitor 202c to accumulate and hold the signal transferred via the column signal line 103. When the switch 203 is turned on, the signal accumulated and held by the storage capacitor 202a and that held by the storage capacitor 202c are averaged. Each of the storage capacitors 202a and 202c holds the averaged signal. When one of the signal transfer switches 211 and 213 is turned on, the signal (averaged signal) held by one of the storage capacitors 202a and 202c is supplied to the horizontal signal line 106 (second step). The adding/averaging unit 107 outputs the averaged signal to the succeeding stage via the horizontal signal line 106.

Alternatively, if the signal transfer switches 211 and 213 are turned on simultaneously, the signals (averaged signals) held by the storage capacitors 202a and 202c are supplied to the horizontal signal line 106. The adding/averaging unit 107 can add, on the horizontal signal line 106, the signals (averaged signals) transferred via the plurality of column signal lines 101 and 103 for two or more columns (second step).

A unit array UA100 in the image sensing region PA100 will be described next with reference to FIG. 2. FIG. 2 is a view showing the unit array UA100 in the image sensing region PA100 (FIG. 1) as in FIG. 13.

In the image sensing region PA100, a plurality of unit arrays UA100 (FIG. 2) are arranged in the column and row directions, as in FIG. 13. Each of the plurality of unit array UA100 includes two or more pixels adjacently arranged in the column and row directions. In this embodiment, each unit array UA100 includes 4×4 adjacent pixels. The unit array UA100 is formed by arranging, in the row direction, four pixel units PU each including four pixels adjacently arranged in the column direction.

Each unit array UA100 includes four first photoelectric conversion units 22B, 24B, 42B, and 44B, two second photoelectric conversion units 21G and 41G, two third photoelectric conversion units 12G and 14G, and a fourth photoelectric conversion unit 11R. The plurality of photoelectric conversion units included in each unit array UA100 form a Bayer array.

The four first photoelectric conversion units 22B, 24B, 42B, and 44B are pixels corresponding to the first color, which are to be added in the column direction by the adding unit 1213 and to be added or averaged in the row direction by the adding/averaging unit 107. More specifically, the four first photoelectric conversion units 22B, 24B, 42B, and 44B are pixels corresponding to the first color, which are to be added in the first step and to be added or averaged in the second step. The first color is, for example, blue (B).

The two second photoelectric conversion units 21G and 41G are pixels corresponding to the second color, which are not to be added in the column direction by the adding unit 1213 but to be added or averaged in the row direction by the adding/averaging unit 107. More specifically, the two second photoelectric conversion units 21G and 41G are pixels corresponding to the second color, which are not to be added in the first step but to be added or averaged in the second step. The second color is, for example, green (Gr) that is adjacent to a red (R) pixel in the row direction.

The two third photoelectric conversion units 12G and 14G are pixels corresponding to the third color, which are to be added in the column direction by the adding unit 1213 but not to be added or averaged in the row direction by the adding/averaging unit 107. More specifically, the two third photoelectric conversion units 12G and 14G are pixels corresponding to the third color, which are to be added in the first step but not to be added or averaged in the second step. The third color is, for example, green (Gb) that is adjacent to a blue (B) pixel in the row direction.

The fourth photoelectric conversion unit 11R is a pixel corresponding to the fourth color, which is neither to be added in the column direction by the adding unit 1213 nor to be added or averaged in the row direction by the adding/averaging unit 107. More specifically, the fourth photoelectric conversion unit 11R is a pixel corresponding to the fourth color, which is neither to be added in the first step nor to be added or averaged in the second step. The fourth color is, for example, red (R).

The first color (B) is arranged at the center of gravity (33R) of the four first photoelectric conversion units 22B, 24B, 42B, and 44B. The second color (G) is arranged at the center of gravity (31R) of the two second photoelectric conversion units 21G and 41G. The third color (G) is arranged at the center of gravity (13R) of the two third photoelectric conversion units 12G and 14G. The fourth color (R) is arranged at the fourth photoelectric conversion unit 11R. The colors thus arranged form a Bayer array.

Figure 3:
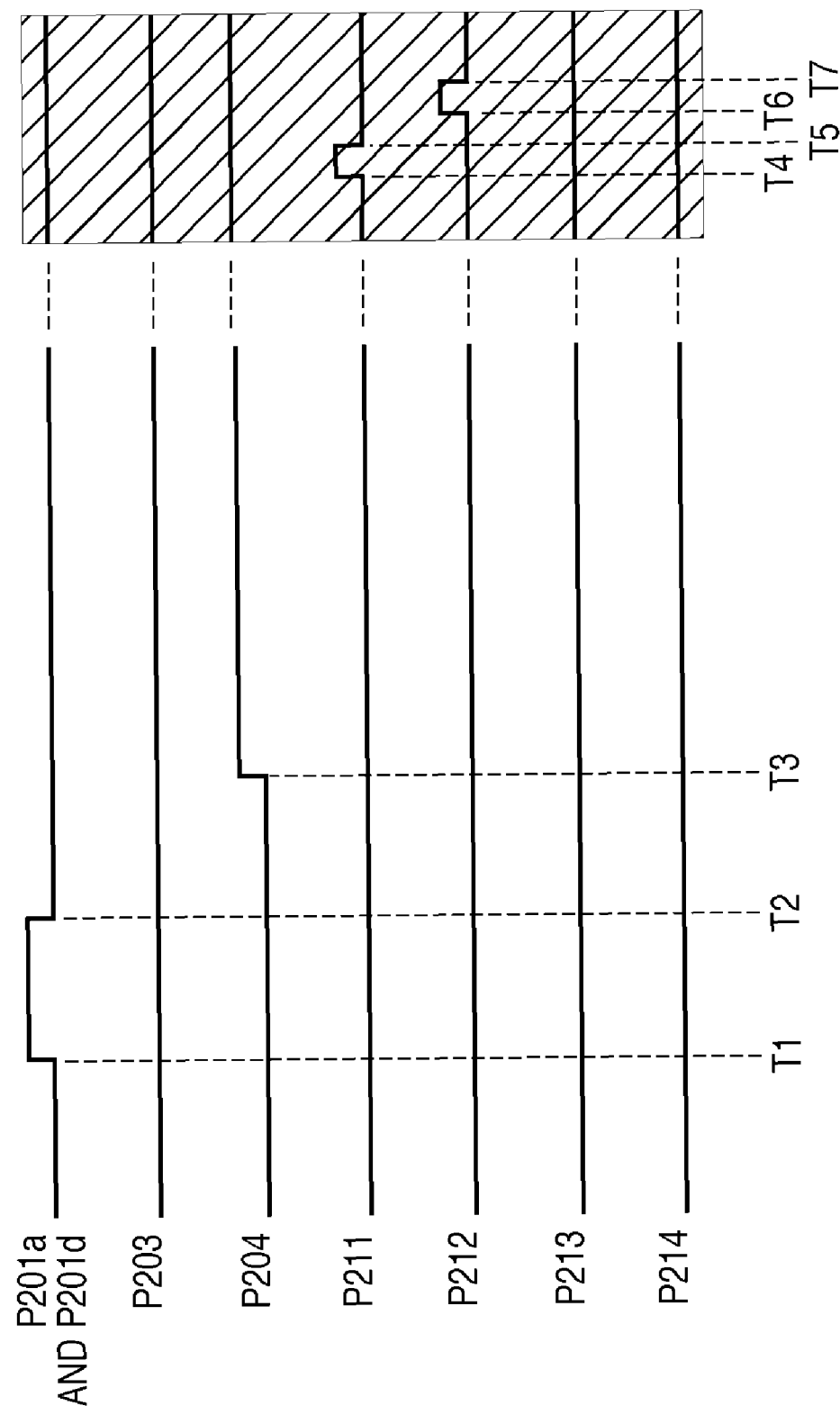
FIG. 3 is a timing chart showing signal waveforms to be supplied to a readout circuit.

A method of compressing the number of pixels in the image sensing apparatus 100 will be described next with reference to FIGS. 2 and 3. FIG. 3 is a timing chart showing signal waveforms to drive the readout unit 105.

In normal readout, an accurate image can be sensed by sequentially reading out all the 4×4 pixels. On the other hand, to compress image signals to obtain a high frame rate, image signals in regions indicated by the broken lines in FIG. 2 are compressed in this embodiment.

The two second photoelectric conversion units 21G and 41G and the fourth photoelectric conversion unit 11R which are arranged on the first row will be described with reference to FIG. 3.

During a period between timings T1 and T2, signals P201a, P201a, P201a, and P201d in an active state are supplied to the gates of the switches 201a, 201b, 201c, and 201d to turn them on (FIG. 1). In each column, the signal (electric carriers) of the photoelectric conversion unit 1201 of V=1 ($1^{st}$ row) is transferred to the carrier holding unit 1209 in accordance with a row selection pulse Tx1 (FIG. 14). The carrier holding unit 1209 does not particularly add the signal. The amplification unit 1210 amplifies the signal by the electric carriers held by the carrier holding unit 1209. The storage capacitors 202a to 202d of the readout unit 105 hold the signals transferred via the column signal lines 101 to 104.

At the timing T2, the signals P201a, P201a, P201a, and P201d in a deactivated state are supplied to the gates of the switches 201a, 201b, 201c, and 201d to turn them off (FIG.

1). The storage capacitors 202a to 202d of the readout unit 105 hold the signals of the respective pixel units PU.

At timing T3, a signal P204 in an active state is supplied to the gate of the switch 204 to turn it on so that the signal held by the storage capacitor 202b and that held by the storage capacitor 202d are averaged (second step). At this time, the signals of the two second photoelectric conversion units 21G and 41G are averaged. The storage capacitor 202b holds the averaged signal.

During a period between timings T4 and T5, a signal P211 in an active state is supplied to the gate of the signal transfer switch 211 to turn it on so that the signal held by the storage capacitor 202a is output via the horizontal signal line 106.

During a period between timings T6 and T7, a signal P212 in an active state is supplied to the gate of the signal transfer switch 212 to turn it on so that the signal (averaged signal) held by the storage capacitor 202b is output via the horizontal signal line 106.

Next, the two third photoelectric conversion units 12G and 14G and the four first photoelectric conversion units 22B, 24B, 42B, and 44B which are arranged on the second to fourth rows are read out.

During the period between the timings T1 and T2, the signals P201a, P201a, P201a, and P201d in an active state are supplied to the gates of the switches 201a, 201b, 201c, and 201d to turn them on. The signals (electric carriers) of the photoelectric conversion units 1202 and 1204 of V=2 ($2^{nd}$ row) and 4 ($4^{th}$ row) are transferred to the carrier holding unit 1209 in accordance with row selection pulses Tx2 and Tx4 (FIG. 14). The adding unit 1213 adds the signals of the photoelectric conversion units 1202 and 1204 on the carrier holding unit 1209 (first step). At this time, the signals (electric carriers) of the two third photoelectric conversion units 12G and 14G are added. In the four first photoelectric conversion units 22B, 24B, 42B, and 44B, the signals (electric carriers) of the photoelectric conversion units 22B and 24B are added, and the signals (electric carriers) of the photoelectric conversion units 42B and 44B are added. The amplification unit 1210 amplifies the signal by the electric carriers held by the carrier holding unit 1209. The storage capacitors 202a to 202d of the readout unit 105 hold the signals transferred via the column signal lines 101 to 104.

At the timing T2, the signals P201a, P201a, P201a, and P201d in a deactivated state are supplied to the gates of the switches 201a, 201b, 201c, and 201d to turn them off. The storage capacitors 202a to 202d of the readout unit 105 hold the signals of the respective pixel units PU.

At the timing T3, the signal P204 in an active state is supplied to the gate of the switch 204 to turn it on so that the signal held by the storage capacitor 202b and that held by the storage capacitor 202d are averaged (second step). At this time, in the four first photoelectric conversion units 22B, 24B, 42B, and 44B, the sum signal of the photoelectric conversion units 22B and 24B and that of the photoelectric conversion units 42B and 44B are averaged. The storage capacitor 202b holds the averaged signal.

During the period between the timings T4 and T5, the signal P211 in an active state is supplied to the gate of the signal transfer switch 211 to turn it on so that the signal held by the storage capacitor 202a is output via the horizontal signal line 106.

During the period between the timings T6 and T7, the signal P212 in an active state is supplied to the gate of the signal transfer switch 212 to turn it on so that the signal (averaged signal) held by the storage capacitor 202b is output via the horizontal signal line 106.

In the above-described way, 4×4 pixels are compressed to 2×2 pixels and output. As the R signal, the signal of the pixel 11R is used. As the Gr signal, the added/averaged signal of the pixels 12G and 14G is used. As the Gb signal, the added/averaged signal of the pixels 21G and 41G is used. As the B signal, the added/averaged signal of the pixels 22B, 24B, 42B, and 44B is used. As a result, the centers of gravity of the added/averaged pixel signals are located on 11R (R), 13R (G), 31R (G), and 33R (B), and form a Bayer array. That is, the pixel signals are not only added in the row direction but also added/averaged in the column direction. It is therefore possible to sufficiently increase the frame rate even when the number of pixels increases. Additionally, since the spatial centers of gravity of the added or averaged signals are arranged at equal intervals in a Bayer array, it is possible to reduce false color (moiré) generation and suppress the decrease in the spatial resolution.

In this embodiment, the following advantages are also obtained in addition to the effect of forming a Bayer array of added or averaged colors. In this embodiment, the number of pixels to be added or averaged changes between the color planes. For example, in FIG. 2, four B pixels are added or averaged. It is therefore possible to increase the sensitivity of the B pixels when the B pixels have low sensitivity in comparison with R pixels or G pixels. Alternatively, if the R color filter has a low transmittance, four R pixels may be added or averaged, whereas a single B pixel may be used.

It is also possible to output signals having the same magnitude by switching the gain of an column amplification unit provided between the amplification unit 1210 and adding/averaging unit 107 or the gain of an output amplifier 108 in accordance with addition and averaging of signals.

It should be noted that, although methods of adding/averaging have been described, reading out signals from each pixel without adding/averaging. The same should be noted in other embodiments.

It should be noted that, although in this embodiment the concept of optical signal readout has been described, as a CMOS sensor readout method, a CDS noise removal method of obtaining the difference between a noise signal and an optical signal can be used. In the CDS noise removal method, more specifically, a storage capacitor for holding a noise signal and a storage capacitor for holding an optical signal are separately prepared. Sampling and holding are done before turning on the pulses Tx1 to Tx4 to accumulate a noise signal. Sampling and holding are done after turning on the pulses Tx1 to Tx4 to accumulate an optical signal. Output amplifier 108 can comprise a circuit for outputting the difference between the noise signal and the optical signal. The noise signal can include a noise generated upon resetting the carrier holding unit and an offset of an column amplification unit that can be provided between the amplification unit 1210 and adding/averaging unit 107. The optical signal includes a image signal to form an image generated by a photoelectric conversion unit and a noise signal. Therefore, subtracting the noise signal from the optical signal provides the image signal in the CDS noise removal method.

Figure 4:
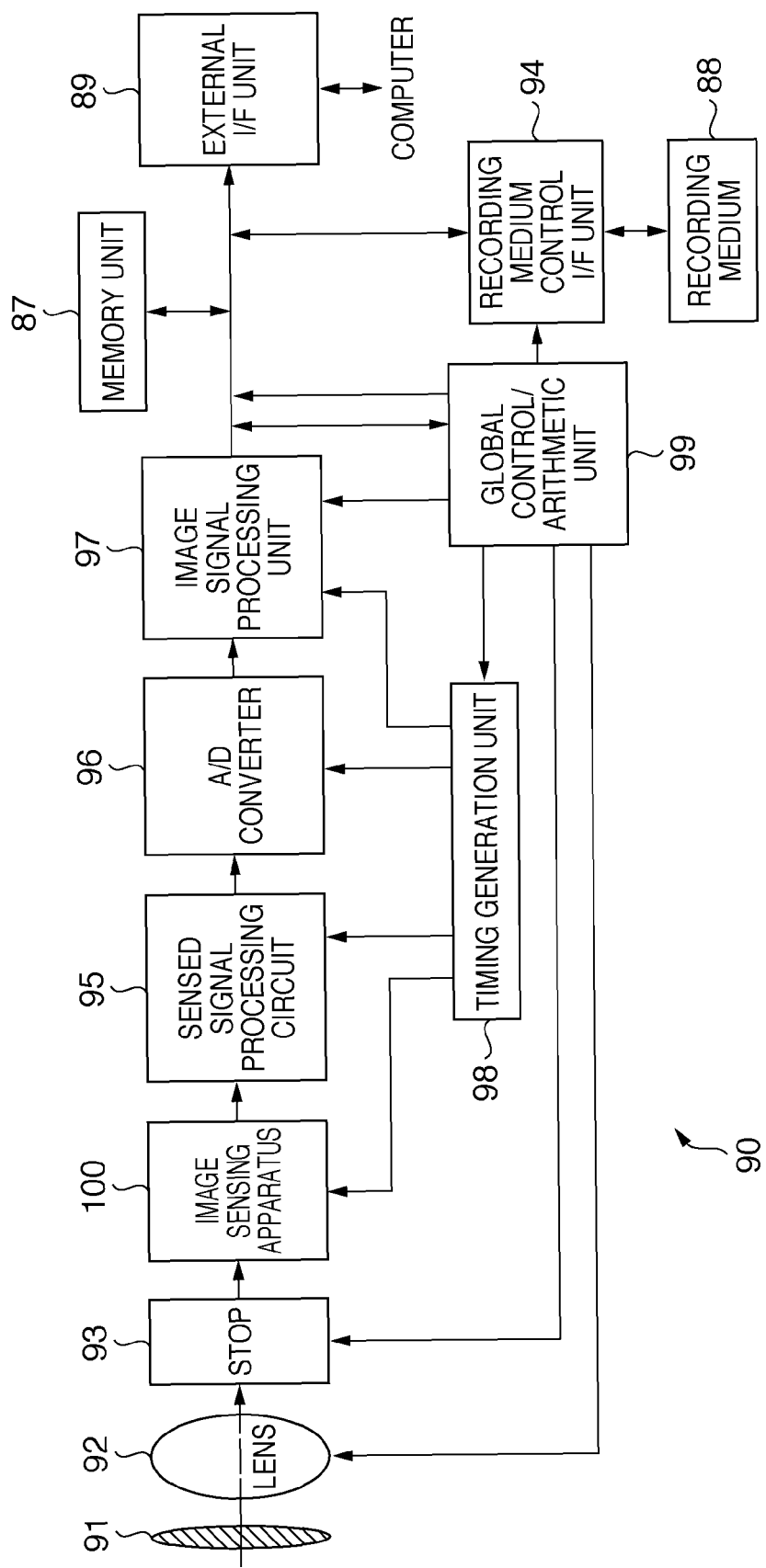
FIG. 4 is a block diagram showing an example of an image capturing system to which the image sensing apparatus of the present invention is applied.

FIG. 4 shows an example of an image capturing system to which the image sensing apparatus of the present invention is applied.

As shown in FIG. 4, an image capturing system 90 mainly includes an optical system, image sensing apparatus 100, and signal processing unit. The optical system mainly includes a shutter 91, taking lens 92, and stop 93. The signal processing unit mainly includes an sensed signal processing circuit 95, A/D converter 96, image signal processing unit 97, memory unit 87, external I/F unit 89, timing generation unit 98, global control/arithmetic unit 99, recording medium 88, and recording medium control I/F unit 94. The signal processing unit need not always include the recording medium 88.

The shutter 91 is located in front of the taking lens 92 on the optical path to control exposure.

The taking lens 92 refracts incident light and forms an object image on a plurality of photoelectric conversion units (pixels) of the image sensing apparatus 100.

The stop 93 is provided on the optical path between the taking lens 92 and the image sensing apparatus 100 to adjust the amount of light which passes through the taking lens 92 and is guided to the image sensing apparatus 100.

The image sensing apparatus 100 converts the object image formed on the plurality of photoelectric conversion units (pixels) into an image signal and outputs it.

The sensed signal processing circuit 95 is connected to the image sensing apparatus 100 to process the image signal output from the image sensing apparatus 100.

The A/D converter 96 is connected to the sensed signal processing circuit 95 to convert the processed image signal (analog signal) output from the sensed signal processing circuit 95 into a image signal (digital signal).

The image signal processing unit 97 is connected to the A/D converter 96 to execute arithmetic processes such as various kinds of correction for the image signal (digital signal) output from the A/D converter 96, thereby generating image data. The image data is supplied to the memory unit 87, external I/F unit 89, global control/arithmetic unit 99, and recording medium control I/F unit 94.

The memory unit 87 is connected to the image signal processing unit 97 to store the image data output from the image signal processing unit 97.

The external I/F unit 89 is connected to the image signal processing unit 97 so that the image data output from the image signal processing unit 97 is transferred to an external device (e.g., personal computer) via the external I/F unit 89.

The timing generation unit 98 is connected to the image sensing apparatus 100, sensed signal processing circuit 95, A/D converter 96, and image signal processing unit 97 to supply a timing signal to them. The image sensing apparatus 100, sensed signal processing circuit 95, A/D converter 96, and image signal processing unit 97 operate in synchronism with the timing signal.

The global control/arithmetic unit 99 is connected to the timing generation unit 98, image signal processing unit 97, and recording medium control I/F unit 94 to comprehensively control them.

The recording medium 88 is detachably connected to the recording medium control I/F unit 94. The image data output from the image signal processing unit 97 is recorded on the recording medium 88 via the recording medium control I/F unit 94.

With the above arrangement, when the image sensing apparatus 100 can obtain an excellent image signal, an excellent image (image data) can be obtained.

In this embodiment, each switch is controlled by a signal supplied from a control unit in the image sensing apparatus 100. The control unit in it is, for example, a scanning circuit (not shown). The scanning circuit is controlled by a signal from the timing generation unit 98.

An image sensing apparatus 200 according to the second embodiment of the present invention will be described next with reference to FIG. 5. Portions different from the first embodiment will mainly be explained, and a description of the same parts as in the first embodiment will be omitted.

The image sensing apparatus 200 has the same basic arrangement as in the first embodiment except the arrangement of an image sensing region PA200.

Figure 5:
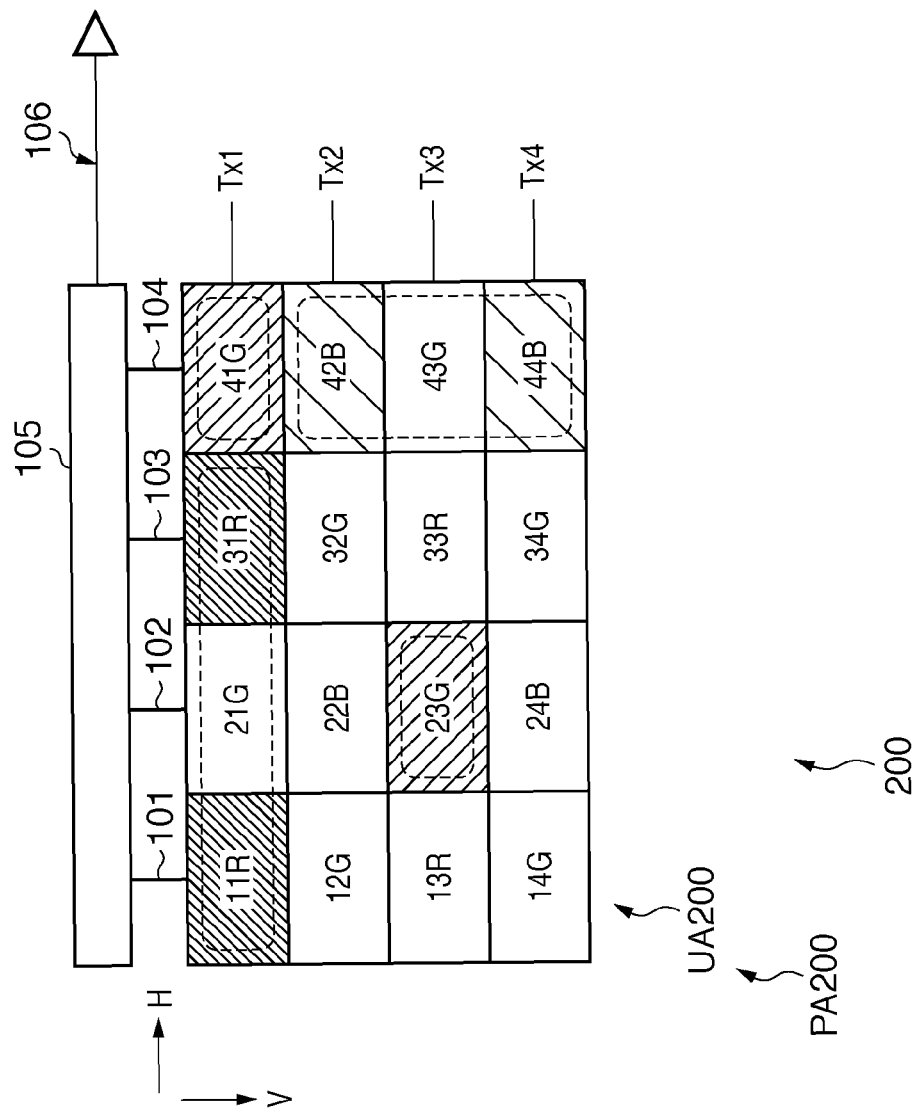
FIG. 5 is a view showing a unit array in an image sensing region according to the second embodiment of the present invention.

A unit array UA200 in the image sensing region PA200 includes two fifth photoelectric conversion units 11R and 31R, two sixth photoelectric conversion units 42B and 44B, a seventh photoelectric conversion unit 23G, and an eighth photoelectric conversion unit 41G, as shown in FIG. 5. One (11R) of R pixels (11R, 31R) and one (44B) of B pixels (42B, 44B) are arranged on the first diagonal line of the unit array, and G pixel (41G) and G pixel (23G) are arranged on the second diagonal line of the unit array.

Unlike the first embodiment, both the seventh photoelectric conversion unit 23G and the eighth photoelectric conversion unit 41G correspond to single G pixel signals. More specifically, the two G pixels have good symmetry after addition or averaging for the unit array UA200. This reduces the shift between the two G pixels after addition or averaging.

The seventh photoelectric conversion unit 23G is a pixel which is neither to be added by an adding unit 1213 nor to be added or averaged by an adding/averaging unit 107. More specifically, the seventh photoelectric conversion unit 23G is a pixel corresponding to the seventh color, which is neither to be added in the first step nor to be added or averaged in the second step. The seventh color is, for example, green (Gr) that is adjacent to a red (R) pixel in the row direction.

The eighth photoelectric conversion unit 41G is a pixel which is neither to be added by the adding unit 1213 nor to be added or averaged by the adding/averaging unit 107. More specifically, the eighth photoelectric conversion unit 41G is a pixel corresponding to the eighth color, which is neither to be added in the first step nor to be added or averaged in the second step. The eighth color is, for example, green (Gr) that is adjacent to a red (R) pixel in the row direction.

In the unit array UA200, the two fifth photoelectric conversion units 11R and 31R are added or averaged, and the two sixth photoelectric conversion units 42B and 44B are added. That is, two R pixels are added or averaged, and two B pixels are added. In a white image, normally, R and B outputs are smaller than a G output, although it depends on the transmittances of color filters. In this embodiment, it is possible to increase the sensitivity of the R and B pixels whose outputs are small and improve the S/N ratio.

The two fifth photoelectric conversion units 11R and 31R are not to be added in the column direction by the adding unit 1213 but to be added or averaged in the row direction by the adding/averaging unit 107. More specifically, the two fifth photoelectric conversion units 11R and 31R are pixels corresponding to the fifth color, which are not to be added in the first step but to be added or averaged in the second step. The fifth color is, for example, red (R).

The two sixth photoelectric conversion units 42B and 44B are pixels corresponding to the sixth color, which are to be added by the adding unit 1213 but not to be added or averaged by the adding/averaging unit 107. The sixth color is, for example, blue (B).

The fifth color (R) is arranged at the center of gravity (21G) of the two fifth photoelectric conversion units 11R and 31R. The sixth color (B) is arranged at the center of gravity (43G) of the two sixth photoelectric conversion units 42B and 44B. The seventh color (G) is arranged at the seventh photoelectric conversion unit 23G. The eighth color (G) is arranged at the eighth photoelectric conversion unit 41G. The colors thus arranged form a Bayer array.

Figure 6:
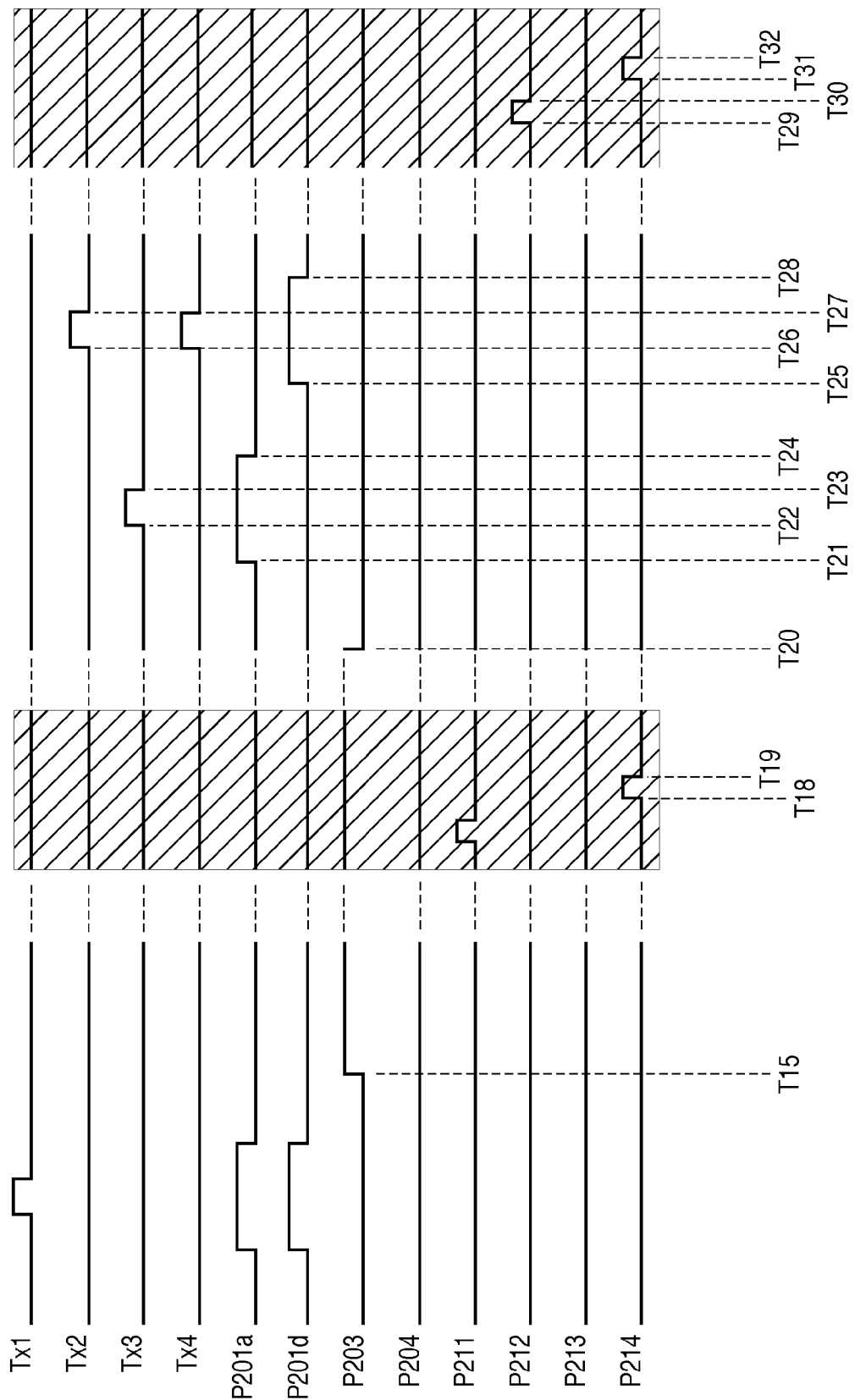
FIG. 6 is a timing chart showing signal waveforms to be supplied to a readout circuit.

A method of compressing an image in the image sensing apparatus 200 is different from the first embodiment in the following points, as shown in FIGS. 5 and 6.

At timing T15, a signal P203 in an active state is supplied to the gate of a switch 203 (FIG. 1) to turn it on so that the signal held by a storage capacitor 202a and that held by a storage capacitor 202c are averaged (second step). At this time, the signals (voltages) of the two fifth photoelectric conversion units 11R and 31R are averaged. The storage capacitor 202a holds the averaged signal.

During a period between timings T18 and T19, a signal P214 in an active state is supplied to the gate of a signal transfer switch 214 to turn it on so that the signal (voltage) held by a storage capacitor 202d is output via a horizontal signal line 106.

The two sixth photoelectric conversion units 42B and 44B and the seventh photoelectric conversion unit 23G will be described next with reference to FIG. 6.

At timing T20, the signal P203 in a deactivated state is supplied to the gate of the switch 203 (FIG. 1) to turn it off.

At timing T21, a signal P201a in an active state is supplied to the gates of switches 201a to 201c (FIG. 1) to turn them on.

During a period between timings T22 and T23, in each column, the signal (electric carriers) of a photoelectric conversion unit 1203 of V=3 ($3^{rd}$ row) is transferred to a carrier holding unit 1209 in accordance with a row selection pulse Tx3 (FIG. 14). The carrier holding unit 1209 does not particularly add the signal. An amplification unit 1210 amplifies the signal (voltage) by the electric carriers held by the carrier holding unit 1209. The signals are read out to the storage capacitors 202a to 202c of a readout unit 105 via column signal lines 101 to 103 and accumulated.

At timing T24, the signal P201a in a deactivated state is supplied to the gates of the switches 201a to 201c to turn them off. The storage capacitors 202a to 202c of the readout unit 105 hold the signals of the respective pixel units PU.

At timing T25, a signal P201d in an active state is supplied to the gate of a switch 201d to turn it on.

During a period between timings T26 and T27, in each column, the signals (electric carriers) of photoelectric conversion units 1202 and 1204 of V=2 ($2^{nd}$ row) and 4 ($4^{th}$ row) are transferred to the carrier holding unit 1209 in accordance with row selection pulses Tx2 and Tx4 (FIG. 14). The adding unit 1213 adds the signals of the photoelectric conversion units 1202 and 1204 on the carrier holding unit 1209 (first step). At this time, the signals (electric carriers) of the two sixth photoelectric conversion units 42B and 44B are added. The amplification unit 1210 amplifies the signal by the electric carriers held by the carrier holding unit 1209. The signal is read out to a storage capacitor 202d of the readout unit 105 via a column signal line 104 and accumulated.

At timing T28, the signal P201d in a deactivated state is supplied to the gate of the switch 201d to turn it off. The storage capacitor 202d of the readout unit 105 holds the signal of the pixel unit PU.

During a period between timings T29 and T30, a signal P212 in an active state is supplied to the gate of a signal transfer switch 212 to turn it on so that the signal held by the storage capacitor 202b is output via the horizontal signal line 106.

During a period between timings T31 and T32, a signal P214 in an active state is supplied to the gate of a signal transfer switch 214 to turn it on so that the signal held by the storage capacitor 202d is output via the horizontal signal line 106.

In the above-described way, 4×4 pixels are compressed to 2×2 pixels and output. As the R signal, the added/averaged signal of the pixels 11R and 31R is used. As the Gr signal, the signal of the pixel 23G is used. As the Gb signal, the signal of the pixel 41G is used. As the B signal, the added signal of the pixels 42B and 44B is used. As a result, the centers of gravity of the added/averaged pixel signals are located on 21G (R), 23G (G), 41G (G), and 43G (B) and form a Bayer array. That is, the pixel signals are not only added in the column direction but also added or averaged in the row direction. It is therefore possible to sufficiently increase the frame rate even when the number of pixels increases. Additionally, since the spatial centers of gravity of the added or averaged signals are arranged at equal intervals in a Bayer array, it is possible to reduce false color (moiré) generation and suppress the decrease in the spatial resolution.

An image sensing apparatus 300 according to the third embodiment of the present invention will be described next with reference to FIG. 7. Portions different from the first embodiment will mainly be explained, and a description of the same parts as in the first embodiment will be omitted.

The image sensing apparatus 300 is different from the first embodiment in that a readout unit 305 has a first readout circuit 305a and a second readout circuit 305b so that the output is performed via two ways of horizontal signal lines 306a and 306b.

The first readout circuit 305a is connected to the horizontal signal line 306a and one end of each of column signal lines 102 and 104. The first readout circuit 305a outputs, via the horizontal signal line 306a, signals transferred via the column signal lines 102 and 104.

The second readout circuit 305b is connected to the horizontal signal line 306b and one end of each of column signal lines 101 and 103. The second readout circuit 305b outputs, via the horizontal signal line 306b, signals transferred via the column signal lines 101 and 103.

Figure 8:
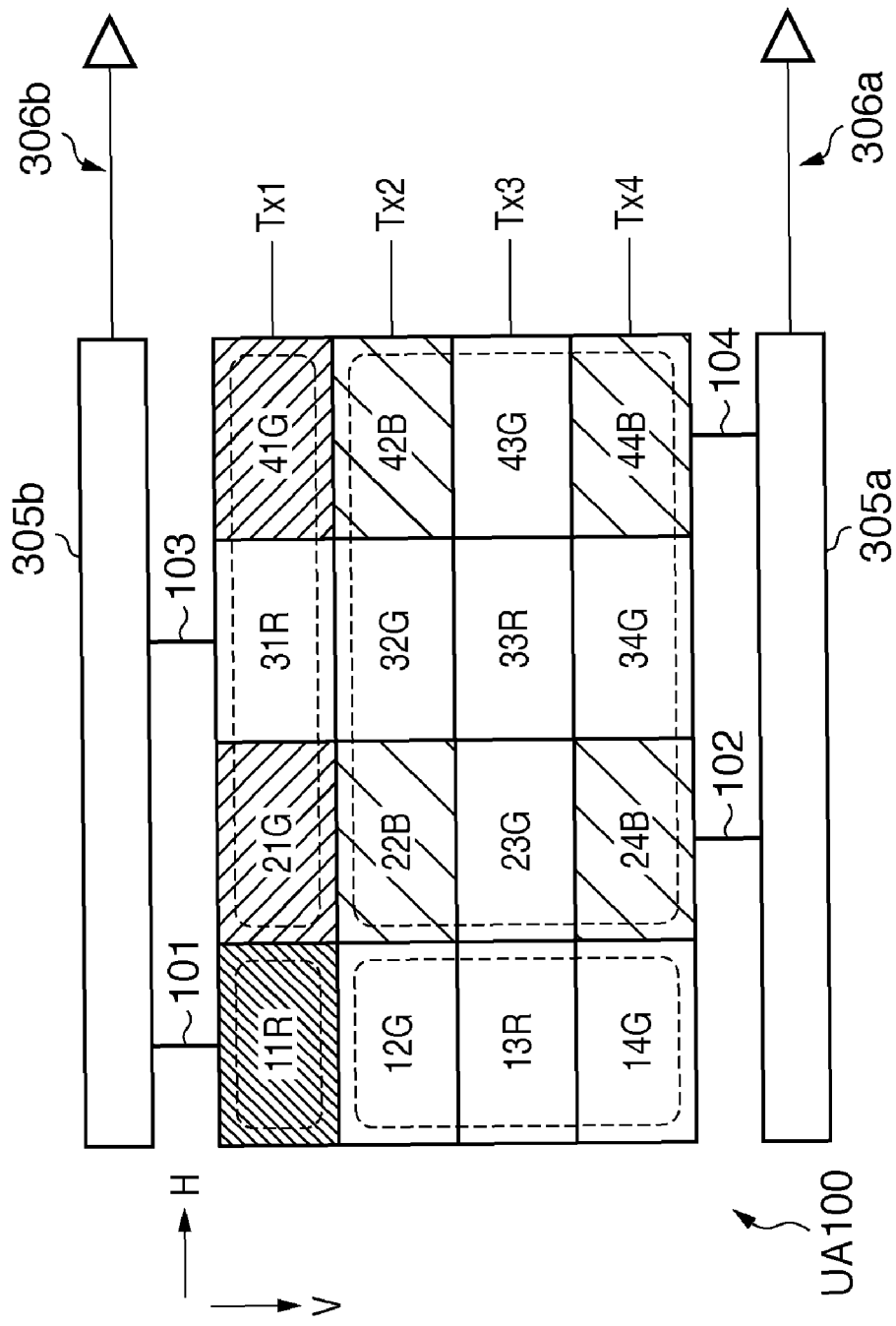
FIG. 8 is a view showing a unit array in an image sensing region according to the third embodiment of the present invention.
Figure 9:
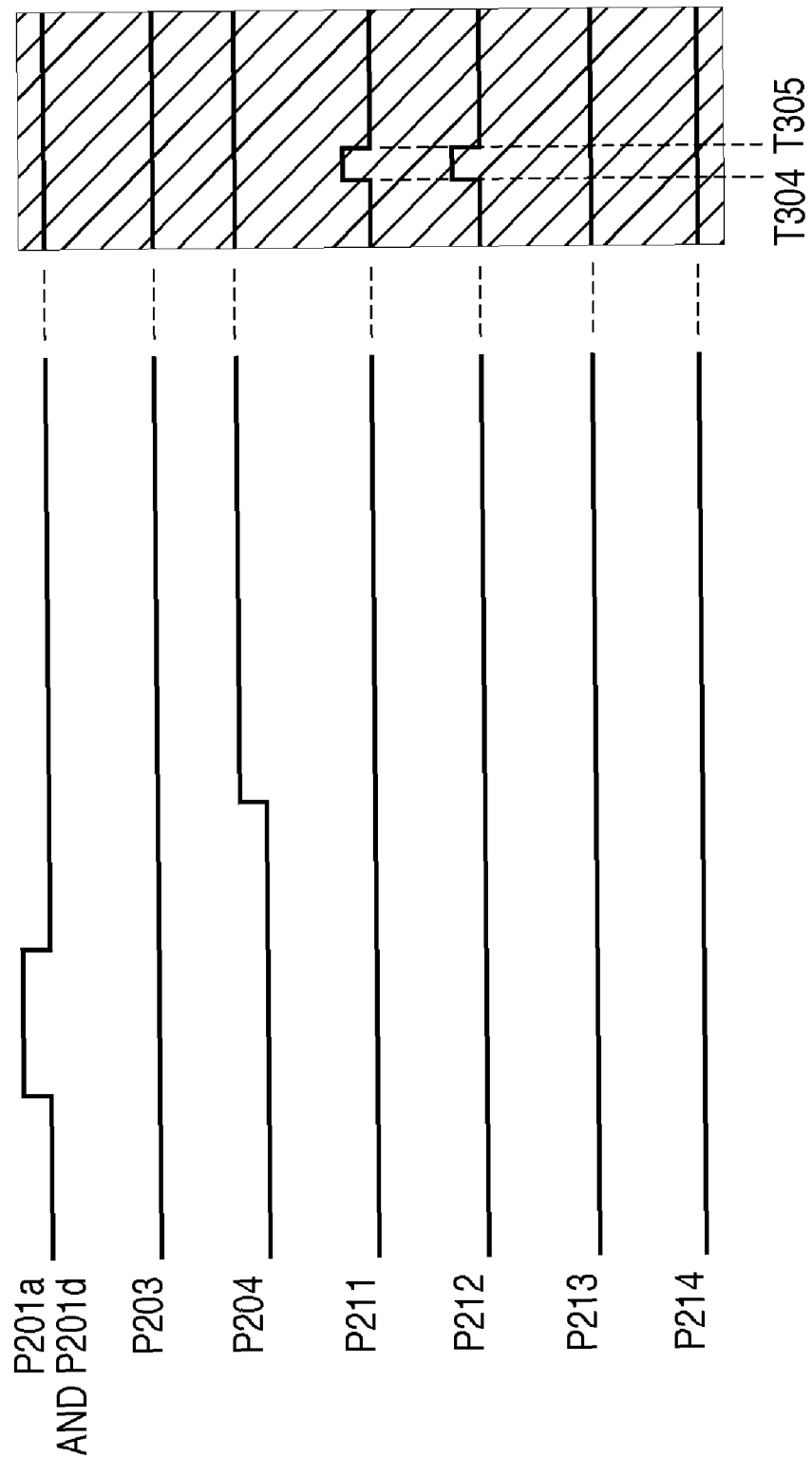
FIG. 9 is a timing chart showing signal waveforms to be supplied to first and second readout circuits.

FIGS. 8 and 9 show a method of compressing an image in the image sensing apparatus 300.

During a period between timings T304 and T305, a signal P211 in an active state is supplied to the gate of a signal transfer switch 211 (FIG. 7) of the second readout circuit 305b to turn it on so that a signal held by a storage capacitor 202a is output via the horizontal signal line 306b. Simultaneously, a signal P212 in an active state is supplied to the gate of a signal transfer switch 212 (FIG. 7) of the first readout circuit 305a to turn it on so that a signal held by a storage capacitor 202b is output via the horizontal signal line 306a.

In this way, the signals are read out via a plurality of channels. It is therefore possible to simultaneously read out the voltages held by the storage capacitors 202a and 202b and speed up the readout by simultaneously turning on, for example, the signal transfer switches 211 and 212. That is, the time (horizontal scanning period) required for the readout can be shortened.

Figure 10:
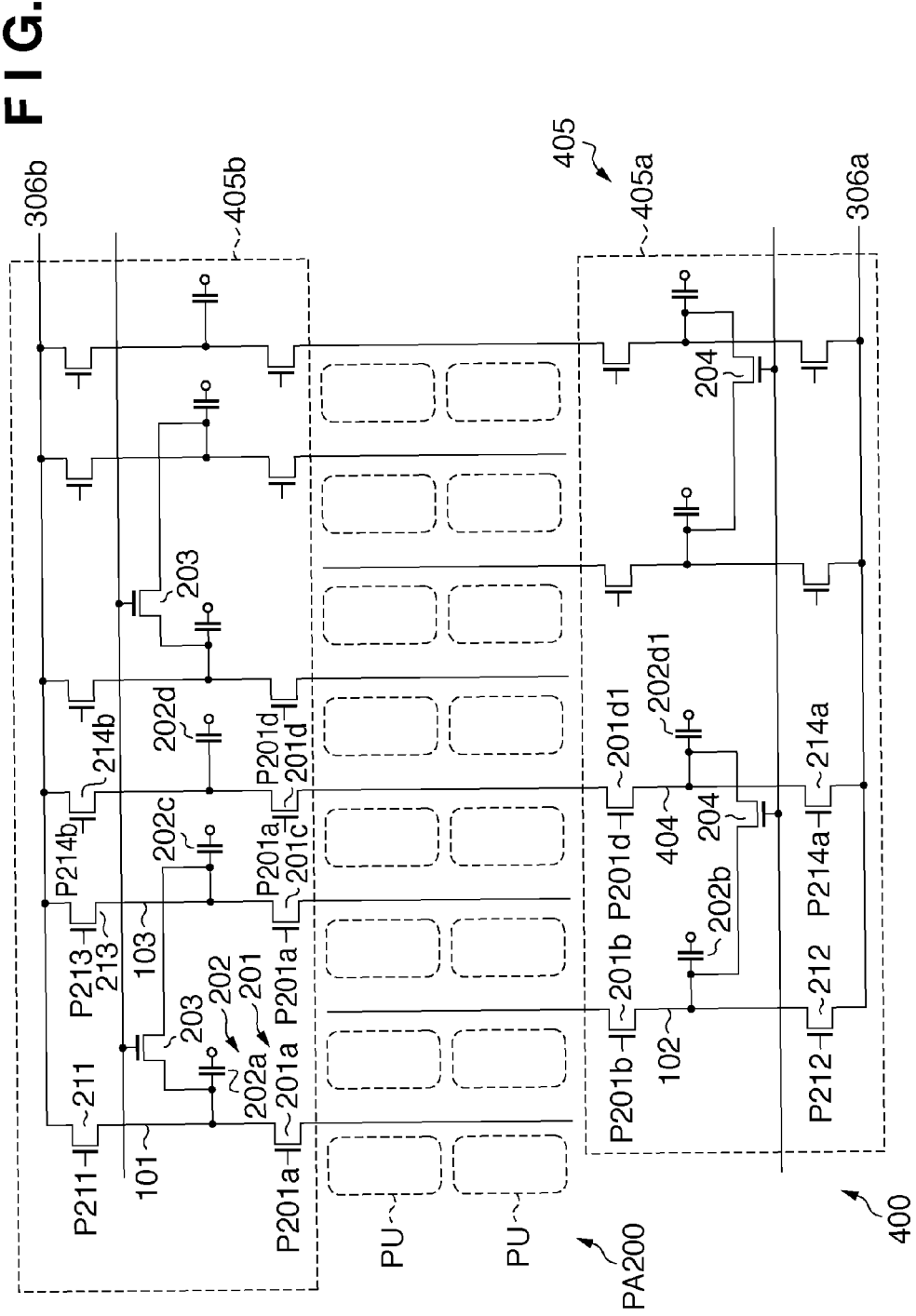
FIG. 10 is a circuit diagram showing the arrangement of an image sensing apparatus according to the fourth embodiment of the present invention.

An image sensing apparatus 400 according to the fourth embodiment of the present invention will be described next with reference to FIG. 10. Portions different from the second and third embodiments will mainly be explained, and a description of the same parts as in the first embodiment will be omitted.

The image sensing apparatus 400 has the same basic arrangement as in the second and third embodiments but is different from the second and third embodiments in that the apparatus comprises a readout unit 405 which includes a first readout circuit 405a, second readout circuit 405b, and comprises a column signal line 404.

Figure 7:
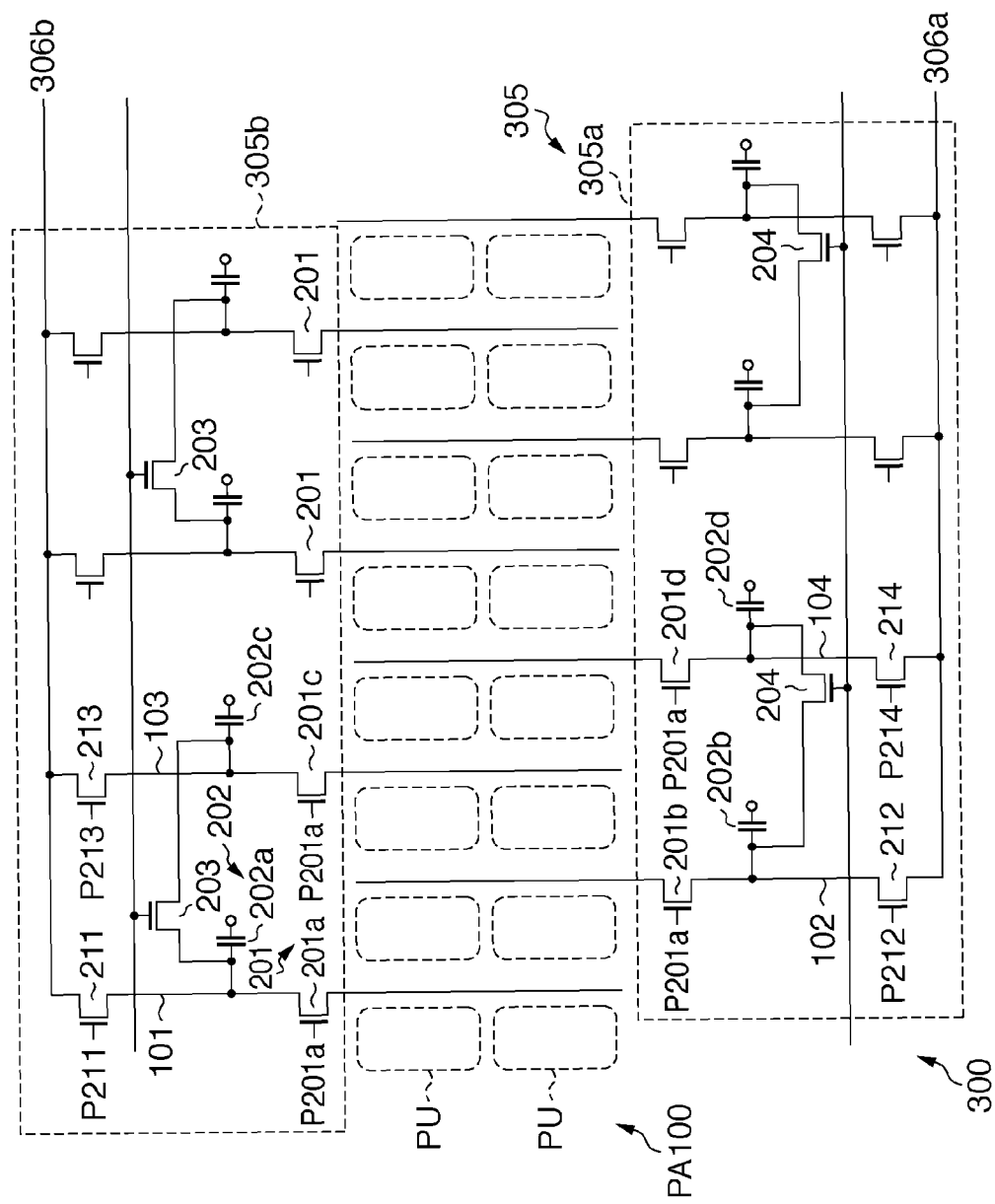
FIG. 7 is a circuit diagram showing the arrangement of an image sensing apparatus according to the third embodiment of the present invention.

More specifically, the column signal line 404 extends to the upper and lower sides and is connected to both of the first readout circuit 405a and the second readout circuit 405b, unlike the column signal line 104 (FIG. 7). More specifically, the first readout circuit 405a includes a switch 201d1, storage capacitor 202d1, and signal transfer switch 214a connected to the column signal line 404, in place of the switch 201d, storage capacitor 202d, and signal transfer switch 214 (FIG. 7). The second readout circuit 405b includes a switch 201d, storage capacitor 202d, and signal transfer switch 214b connected to the column signal line 404.

Assume that the column signal line 404 is connected to only the first readout circuit 405a. In this case, the added/averaged signal of pixels 11R and 31R can be output to the upper side via column signal lines 101 and 103. However, the signal of a pixel 23G, the signal of a pixel 41G, and the added signal of pixels 42B and 44B are output to the lower side. The number of signals (number of colors) handled by the upper readout circuit is different from that of the lower readout circuit. It is therefore impossible to sufficiently obtain the merits of fast readout operation by the effect of the two way output performance.

In the fourth embodiment, however, the signal of the pixel 41G is read out to the upper side via the column signal line 404, and the added signal of the pixels 42B and 44B is read out to the lower side. That is, the number of signals (number of colors) handled by the upper readout circuit can be equal to that of the lower readout circuit.

In a switch group 201, the switches 201a, 201c, and 201d and the switches 201b and 201d1 individually operate. In readout operation of this embodiment, first, the signal of V=1 ($1^{st}$ row) is transferred to the storage capacitors 202a, 202c, and 202d on the upper side via the switches 201a, 201c, and 201d. Next, the signal of V=3 ($3^{rd}$ row) is transferred to the storage capacitor 202b on the lower side via the switch 201b connected to the column signal line 102. The signals of V=2 ($2^{nd}$ row) and 4 ($4^{th}$ row) are added on the carrier holding unit 1209 and then transferred to the storage capacitor 202d1 on the lower side via the switch 201d1 connected to the column signal line 404. After averaging signals held by storage capacitors 202a and 202c by turning on a switch 203, the transfer switches 211 and 214b sequentially turn on so that the signal is output to the horizontal signal line 306b. On the other hand, the signal is output to the horizontal signal line 306a by sequentially turning on the transfer switches 212 and 214a. In this embodiment, the switches 211 and 212 are simultaneously turned on, and the switches 214b and 214a are simultaneously turned on. The readout unit 405 reads out signals in parallel via two ways of the horizontal signal lines 306b and 306a. This makes it possible to shorten the readout time.

Figure 11:
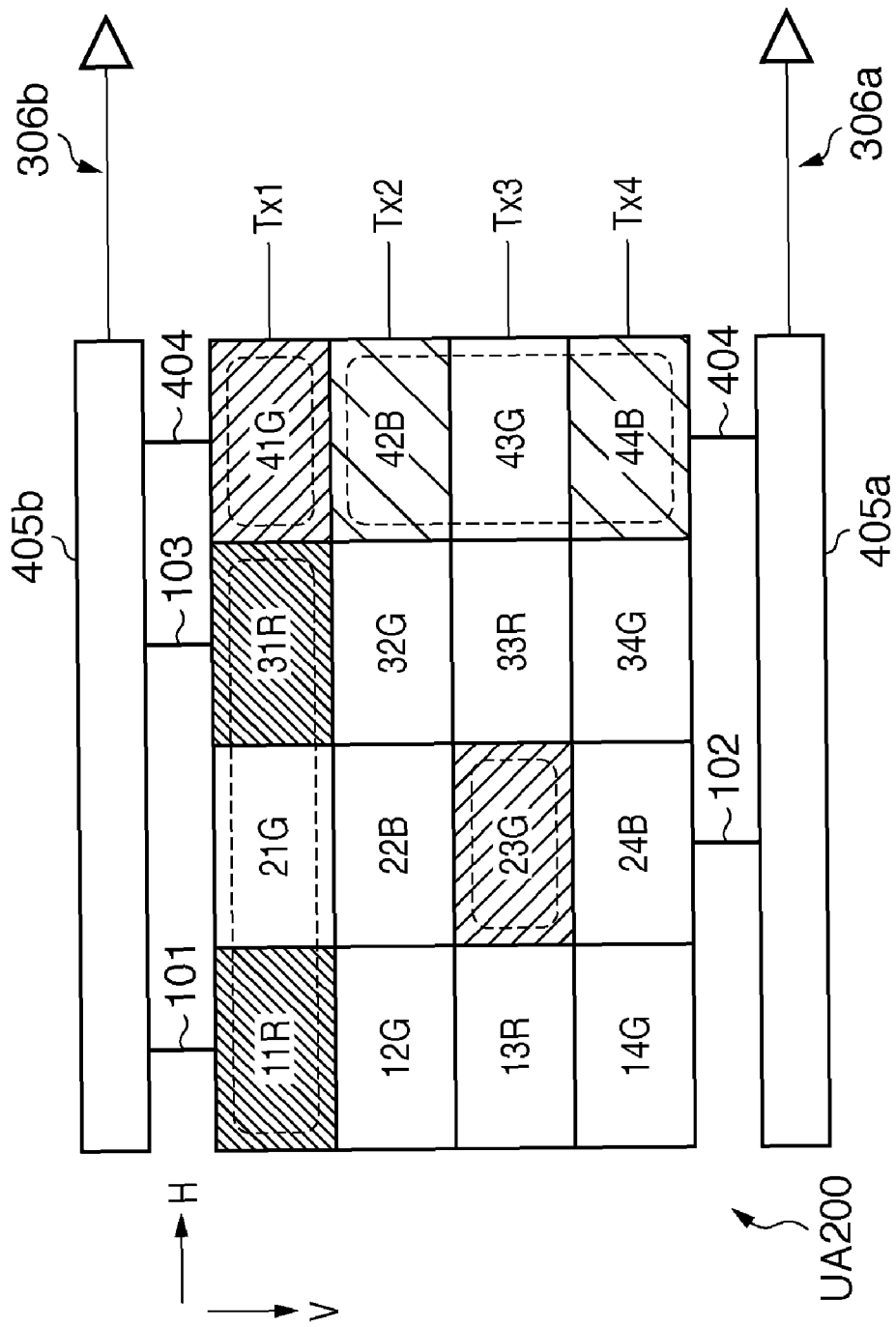
FIG. 11 is a view showing a unit array in an image sensing region according to the fourth embodiment of the present invention.
Figure 12:
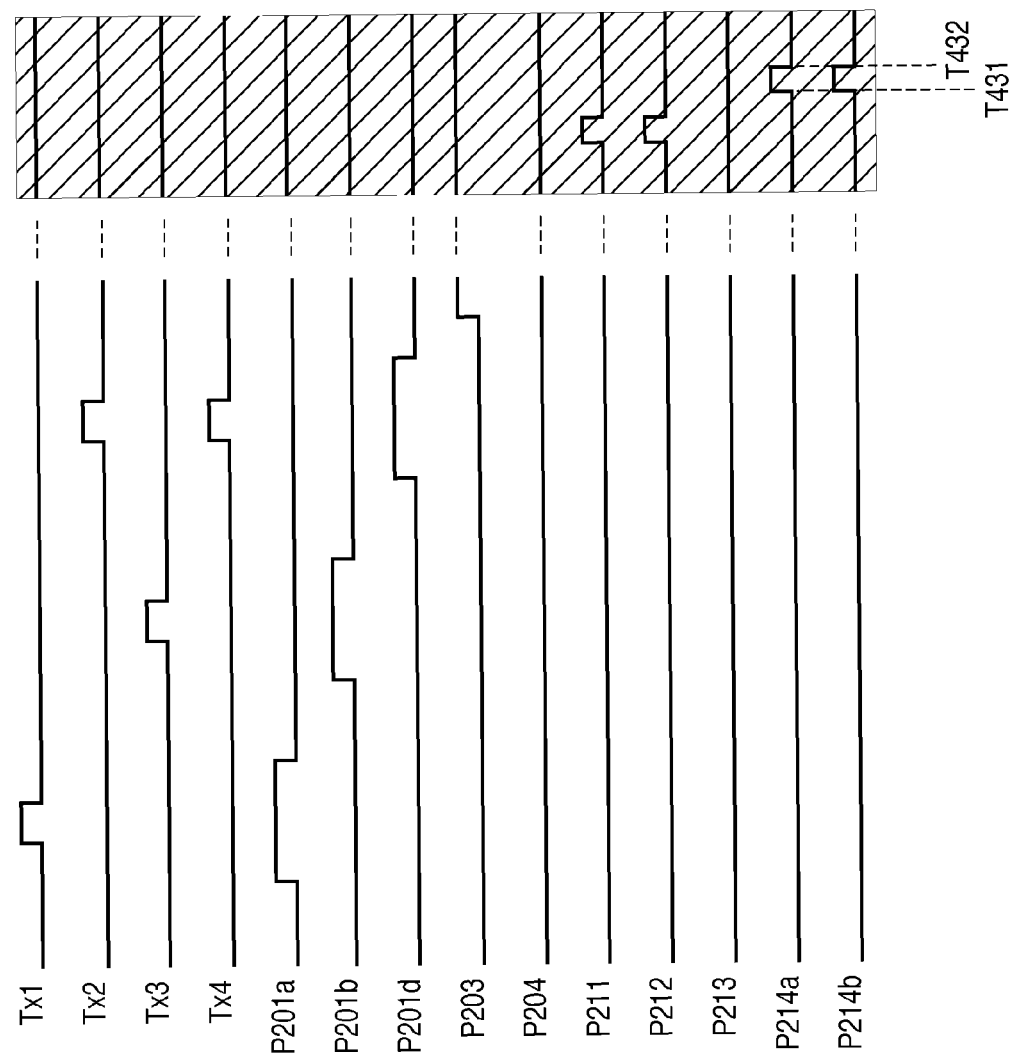
FIG. 12 is a timing chart showing signal waveforms to be supplied to first and second readout circuits.

FIGS. 11 and 12 show a method of compressing an image in the image sensing apparatus 400.

During a period between timings T431 and T432, a signal P214a in an active state is supplied to the gate of the signal transfer switch 214a (FIG. 10) of the first readout circuit 405a to turn it on so that a signal held by the storage capacitor 202d1 is output via the horizontal signal line 306a. Simultaneously, a signal P214b in an active state is supplied to the gate of the signal transfer switch 214b (FIG. 10) of the second readout circuit 405b to turn it on so that a signal held by the storage capacitor 202d is output via the horizontal signal line 306b.

It should be noted that signals of different phases may be output to the horizontal signal lines 306a and 306b by shifting the phase between the signals P211 and P212 or shifting the phase between the signals P214a and P214b shown in FIG. 12. In this case, a plurality of output operations can be sequentially performed by multiplexing the horizontal signal lines 306a and 306b. This allows decreasing the number of pins and reducing the packaging cost and the process IC cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-182552, filed Jul. 11, 2007, which is hereby incorporated by reference herein in its entirety.

What is claimed is:

1. A method of driving an image sensing apparatus including an image sensing region, which includes a plurality of photoelectric conversion units arranged in a column direction and in a row direction, a plurality of column signal lines each capable of transferring, for each column, a signal corresponding to electric carriers of each of the plurality of photoelectric conversion units, and a plurality of color filters each of which selectively transmits one of light components of a first color, a second color, a third color, and a fourth color, the method comprising:
   a first step of adding signals of at least two photoelectric conversion units arranged in the column direction in the image sensing region; and
   a second step of adding or averaging, for at least two columns, signals output via the plurality of column signal lines after the first step,
   wherein, in the image sensing region, a plurality of unit arrays are arranged in the column direction and in the row direction, each of the plurality of unit arrays including
      four first photoelectric conversion units, on which the light component of the first color is incident, signals of which are to be added in the first step and to be added or averaged in the second step,
   two second photoelectric conversion units, on which the light component of the second color is incident, signals of which are not to be added in the first step but to be added or averaged in the second step,
   two third photoelectric conversion units, on which the light component of the third color is incident, signals of which are to be added in the first step but not to be added or averaged in the second step, and
   a fourth photoelectric conversion unit, on which the light component of the fourth color is incident, signals of which are neither to be added in the first step nor to be added or averaged in the second step,
   wherein one of the four first photoelectric conversion units and the fourth photoelectric conversion unit are arranged on a first diagonal line in the unit array,
   wherein one of the two second photoelectric conversion units and one of the two third photoelectric conversion units are arranged on a second diagonal line in the unit array, and
   wherein an array formed by a center of gravity of the four first photoelectric conversion units, a center of gravity of the two second photoelectric conversion units, a center of gravity of the two third photoelectric conversion units, and a center of gravity of the fourth photoelectric conversion unit is a Bayer array.

2. The method according to claim 1, wherein
the plurality of color filters include
   a first color filter, which selectively transmits the light component of the first color to make the light component of the first color incident on the first photoelectric conversion unit, a second color filter, which selectively transmits the light component of the second color to make the light component of the second color incident on the second photoelectric conversion unit, a third color filter, which selectively transmits the light component of the third color to make the light component of the third color incident on the third photoelectric conversion unit, and a fourth color filter, which selectively transmits the light component of the fourth color to make the light component of the fourth color incident on the fourth photoelectric conversion unit, wherein an array of the plurality of color filters is a Bayer array.

3. The method according to claim 1, wherein, in the image sensing region, a plurality of pixel units are arranged in the column direction and in the row direction, each of the plurality of pixel units including at least four photoelectric conversion units arranged in the column direction, a carrier holding unit which holds electric carriers accumulated in at least one of the at least four photoelectric conversion units, and at least four carrier transfer units which transfer the electric carriers generated in at least one of the at least four photoelectric conversion units to the carrier holding unit, and wherein, in the first step, the at least four carrier transfer units add the signals generated in two or more photoelectric conversion units by transferring electric carriers from the two or more of the at least four photoelectric conversion units to the carrier holding unit.

4. The method according to claim 1, wherein the image sensing apparatus further includes a readout unit, which reads out signals from the plurality of photoelectric conversion units via the plurality of column signal lines, and a horizontal signal line, which receives the signals from the readout unit, and wherein, in the second step, the readout unit adds, for at least two columns, signals output via the plurality of column signal lines by averaging the signals of the at least two columns and outputting all of the averaged signals to the horizontal signal line, or averages by averaging the signals of the at least two columns and outputting one of the averaged signals to the horizontal signal line.

5. The method according to claim 4, wherein the readout unit includes a first readout circuit connected to one end of each of at least some of the plurality of column signal lines, and a second readout circuit connected to the other end of each of at least some of the plurality of column signal lines, wherein the horizontal signal line includes a first horizontal signal line, which receives a signal from the first readout circuit, and a second horizontal signal line, which receives a signal from the second readout circuit, and wherein, in the second step, an operation of causing the first readout circuit to supply a signal to the first horizontal signal line and an operation of causing the second readout circuit to supply a signal to the second horizontal signal line are performed in parallel.

6. A method of driving an image sensing apparatus including an image sensing region, which includes a plurality of photoelectric conversion units arranged in a column direction and in a row direction, a plurality of column signal lines each capable of transferring, for each column, a signal corresponding to electric carriers of each of the plurality of photoelectric conversion units, and a plurality of color filters each of which selectively transmits one of light components of a fifth color, a sixth color, a seventh color, and an eighth color, the method comprising:

a first step of adding signals of at least two photoelectric conversion units arranged in the column direction in the image sensing region; and a second step of adding or averaging, for at least two columns, signals output via the plurality of column signal lines after the first step, wherein, in the image sensing region, a plurality of unit arrays are arranged in the column direction and in the row direction, each of the plurality of unit arrays including two fifth photoelectric conversion units, on which the light component of the fifth color is incident, signals of which are not to be added in the first step but to be added or averaged in the second step, two sixth photoelectric conversion units, on which the light component of the sixth color is incident, signals of which are to be added in the first step but not to be added or averaged in the second step, a seventh photoelectric conversion unit, on which the light component of the seventh color is incident, a signal of which is neither to be added in the first step nor to be added or averaged in the second step, and an eighth photoelectric conversion unit, on which the light component of the eighth color is incident, a signal of which is neither to be added in the first step nor to be added or averaged in the second step, wherein one of the two fifth photoelectric conversion units and one of the two sixth photoelectric conversion units are arranged on a first diagonal line in the unit array, wherein the seventh photoelectric conversion unit and the eighth photoelectric conversion unit are arranged on a second diagonal line in the unit array, and wherein an array formed by a center of gravity of the two fifth photoelectric conversion units, a center of gravity of the two sixth photoelectric conversion units, a center of gravity of the seventh photoelectric conversion unit, and a center of gravity of the eighth photoelectric conversion unit is a Bayer array.

7. The method according to claim 6, wherein the plurality of color filters include a fifth color filter, which selectively transmits the light component of the fifth color to make the light component of the fifth color incident on the fifth photoelectric conversion unit, a sixth color filter, which selectively transmits the light component of the sixth color to make the light component of the sixth color incident on the sixth photoelectric conversion unit, a seventh color filter, which selectively transmits the light component of the seventh color to make the light component of the seventh color incident on the seventh photoelectric conversion unit, and an eighth color filter, which selectively transmits the light component of the eighth color to make the light component of the eighth color incident on the eighth photoelectric conversion unit, and wherein an array of the plurality of color filters is a Bayer array.

8. The method according to claim 6,
wherein, in the image sensing region, a plurality of pixel units are arranged in the column direction and in the row direction, each of the plurality of pixel units including
at least four photoelectric conversion units arranged in the column direction,
a carrier holding unit, which holds electric carriers accumulated in at least one of the at least four photoelectric conversion units, and
at least four carrier transfer units, which transfer the electric carriers generated in at least one of the at least four photoelectric conversion units to the carrier holding unit, and
wherein, in the first step, the at least four carrier transfer units add the signals generated in two or more photoelectric conversion units by transferring electric carriers from the two or more of the at least four photoelectric conversion units to the carrier holding unit.

9. The method according to claim 6,
wherein the image sensing apparatus further includes
a readout unit, which reads out signals from the plurality of photoelectric conversion units via the plurality of column signal lines, and
a horizontal signal line, which receives the signals from the readout unit, and
wherein, in the second step, the readout unit adds, for at least two columns, signals output via the plurality of column signal lines by averaging the signals of the at least two columns and outputting all of the averaged signals to the horizontal signal line, or averages by averaging the signals of the at least two columns and outputting one of the averaged signals to the horizontal signal line.

10. The method according to claim 9,
wherein the readout unit includes
a first readout circuit connected to one end of each of at least some of the plurality of column signal lines, and
a second readout circuit connected to the other end of each of at least some of the plurality of column signal lines,
wherein the horizontal signal line includes
a first horizontal signal line which receives a signal from the first readout circuit, and
a second horizontal signal line which receives a signal from the second readout circuit, and
wherein, in the second step, an operation of causing the first readout circuit to supply the signal to the first horizontal signal line and an operation of causing the second readout circuit to supply the signal to the second horizontal signal line are performed in parallel.

11. An image sensing apparatus comprising:
a plurality of color filters each of which selectively transmits one of light components of a first color, a second color, a third color, and a fourth color;
an image sensing region which includes a plurality of photoelectric conversion units arranged in a column direction and in a row direction, and a plurality of adding units each capable of adding, for each column, signals of at least four of the plurality of photoelectric conversion units arranged in the column direction;
a plurality of column signal lines each capable of transferring a signal corresponding to electric carriers of each of the plurality of photoelectric conversion units; and
an adding/averaging unit capable of adding or averaging, for at least two columns, the signals transferred via the plurality of column signal lines,
wherein, in the image sensing region, a plurality of unit arrays are arranged in the column direction and in the row direction, each of the plurality of unit arrays including
four first photoelectric conversion units on which the light component of the first color is incident, signals of which are to be added by the adding unit and to be added or averaged by the adding/averaging unit,
two second photoelectric conversion units on which the light component of the second color is incident, signals of which are not to be added by the adding unit but to be added or averaged by the adding/averaging unit,
two third photoelectric conversion units on which the light component of the third color is incident, signals of which are to be added by the adding unit but not to be added or averaged by the adding/averaging unit, and
a fourth photoelectric conversion unit on which the light component of the fourth color is incident, signals of which are neither to be added by the adding unit nor to be added or averaged by the adding/averaging unit,
wherein one of the four first photoelectric conversion units and the fourth photoelectric conversion unit are arranged on a first diagonal line in the unit array,
wherein one of the two second photoelectric conversion units and one of the two third photoelectric conversion units are arranged on a second diagonal line in the unit array, and
wherein an array formed by a center of gravity of the four first photoelectric conversion units, a center of gravity of the two second photoelectric conversion units, a center of gravity of the two third photoelectric conversion units, and a center of gravity of the fourth photoelectric conversion unit is a Bayer array.

12. An image capturing system comprising:
an image sensing apparatus of claim 11;
an optical system, which forms an image of light on the image sensing region of the image sensing apparatus; and
a signal processing unit, which processes a signal output from the image sensing apparatus to generate image data.

13. An image sensing apparatus comprising:
a plurality of color filters each of which selectively transmits one of light components of a fifth color, a sixth color, a seventh color, and an eighth color;
an image sensing region, which includes a plurality of photoelectric conversion units arranged in a column direction and in a row direction, and a plurality of adding units each capable of adding, for each column, signals of at least four of the plurality of photoelectric conversion units arranged in the column direction;
a plurality of column signal lines each capable of transferring a signal corresponding to electric carriers of each of the plurality of photoelectric conversion units; and
an adding/averaging unit capable of adding or averaging, for at least two columns, the signals transferred via the plurality of column signal lines,
wherein in the image sensing region, a plurality of unit arrays are arranged in the column direction and in the row direction, each of the plurality of unit arrays including
two fifth photoelectric conversion units on which the light component of the fifth color is incident, signals of which are not to be added by the adding unit but to be added or averaged by the adding/averaging unit, two sixth photoelectric conversion units on which the light component of the sixth color is incident, signals of which are to be added by the adding unit but not to be added or averaged by the adding/averaging unit, a seventh photoelectric conversion unit on which the light component of the seventh color is incident, signals of which is neither to be added by the adding unit nor to be added or averaged by the adding/averaging unit, and an eighth photoelectric conversion unit on which the light component of the eighth color is incident, signals of which is neither to be added by the adding unit nor to be added or averaged by the adding/averaging unit, wherein one of the two fifth photoelectric conversion units and one of the two sixth photoelectric conversion units are arranged on a first diagonal line in the unit array, and wherein the seventh photoelectric conversion unit and the eighth photoelectric conversion unit are arranged on a second diagonal line in the unit array.

14. An image capturing system comprising:

an image sensing apparatus of claim 13;

an optical system, which forms an image of light on the image sensing region of the image sensing apparatus; and a signal processing unit, which processes a signal output from the image sensing apparatus to generate image data.

* * * * *